United States Patent
Sinha et al.

(10) Patent No.: US 11,995,085 B2
(45) Date of Patent: May 28, 2024

(54) SYSTEM, METHOD, AND COMPUTER PROGRAM PRODUCT FOR EFFICIENTLY STORING MULTI-THREADED LOG DATA

(71) Applicant: Visa International Service Association, San Francisco, CA (US)

(72) Inventors: Rohit Sinha, Bokaro Steel (IN); Shashwat Mishra, Nawabganj (IN)

(73) Assignee: Visa International Service Association, San Francisco, CA (US)

( * ) Notice: Subject to any disclaimer, the term of this patent is extended or adjusted under 35 U.S.C. 154(b) by 85 days.

(21) Appl. No.: 17/680,625

(22) Filed: Feb. 25, 2022

(65) Prior Publication Data
US 2023/0273926 A1    Aug. 31, 2023

(51) Int. Cl.
*G06F 16/20* (2019.01)
*G06F 16/21* (2019.01)
*G06F 16/23* (2019.01)
*G06F 16/2455* (2019.01)

(52) U.S. Cl.
CPC ........ *G06F 16/24552* (2019.01); *G06F 16/21* (2019.01); *G06F 16/2358* (2019.01)

(58) Field of Classification Search
CPC . G06F 16/24552; G06F 16/21; G06F 16/2358
See application file for complete search history.

(56) References Cited

U.S. PATENT DOCUMENTS

| | | | |
|---|---|---|---|
| 9,928,264 B2 * | 3/2018 | Lomet | G06F 16/2255 |
| 10,089,229 B2 | 10/2018 | Herdrich et al. | |
| 10,664,199 B2 | 5/2020 | Dulloor et al. | |
| 2004/0128470 A1 * | 7/2004 | Hetzler | G06F 12/0804 |
| | | | 711/E12.04 |
| 2011/0276744 A1 * | 11/2011 | Sengupta | G06F 12/0246 |
| | | | 711/216 |
| 2012/0203958 A1 * | 8/2012 | Jones | G06F 12/0246 |
| | | | 711/E12.008 |

(Continued)

FOREIGN PATENT DOCUMENTS

| | | |
|---|---|---|
| CN | 109165193 A | 1/2019 |
| EP | 3695303 A2 | 8/2020 |

(Continued)

*Primary Examiner* — Daniel A Kuddus
(74) *Attorney, Agent, or Firm* — The Webb Law Firm

(57) ABSTRACT

Systems, methods, and computer program products are provided for efficiently storing multi-threaded log data. A method includes receiving multi-threaded log data comprising logs, markers, and thread identifiers. For each respective log, the respective thread identifier is set as a most recently used item in a thread reference cache. A respective log cache in a map data structure is determined based on the respective thread identifier. The respective log is added to the respective log cache. Whether to communicate the respective log and/or the respective log cache to a first repository is determined based on the respective marker. The respective log is communicated to a second repository. Whether to remove an oldest log from the log cache is determined based on a log cache size limit and/or a time limit. Whether to remove a least recently used log cache is determined based on at least one map data structure size limit.

16 Claims, 13 Drawing Sheets

(56) References Cited

U.S. PATENT DOCUMENTS

| | | | |
|---|---|---|---|
| 2013/0173853 A1* | 7/2013 | Ungureanu | G06F 12/0891 |
| | | | 711/135 |
| 2013/0183853 A1* | 7/2013 | Sivik | H02G 3/22 |
| | | | 439/519 |
| 2014/0214752 A1 | 7/2014 | Rash et al. | |
| 2016/0062791 A1* | 3/2016 | Cain, III | G06F 12/0891 |
| | | | 711/136 |
| 2016/0062899 A1* | 3/2016 | Cain, III | G06F 9/4843 |
| | | | 711/125 |
| 2016/0110403 A1* | 4/2016 | Lomet | G06F 16/2255 |
| | | | 707/695 |
| 2016/0364270 A1* | 12/2016 | Cain, III | G06F 9/5016 |
| 2018/0253467 A1* | 9/2018 | Gurajada | G06F 11/1471 |
| 2019/0146917 A1* | 5/2019 | Lomet | G06F 12/1009 |
| | | | 711/135 |
| 2019/0215363 A1 | 7/2019 | Olson | |

FOREIGN PATENT DOCUMENTS

| | | |
|---|---|---|
| WO | WO01/7780 A2 * | 10/2001 |
| WO | WO01/77820 A1 * | 10/2001 |
| WO | 2019228573 A2 | 12/2019 |

* cited by examiner

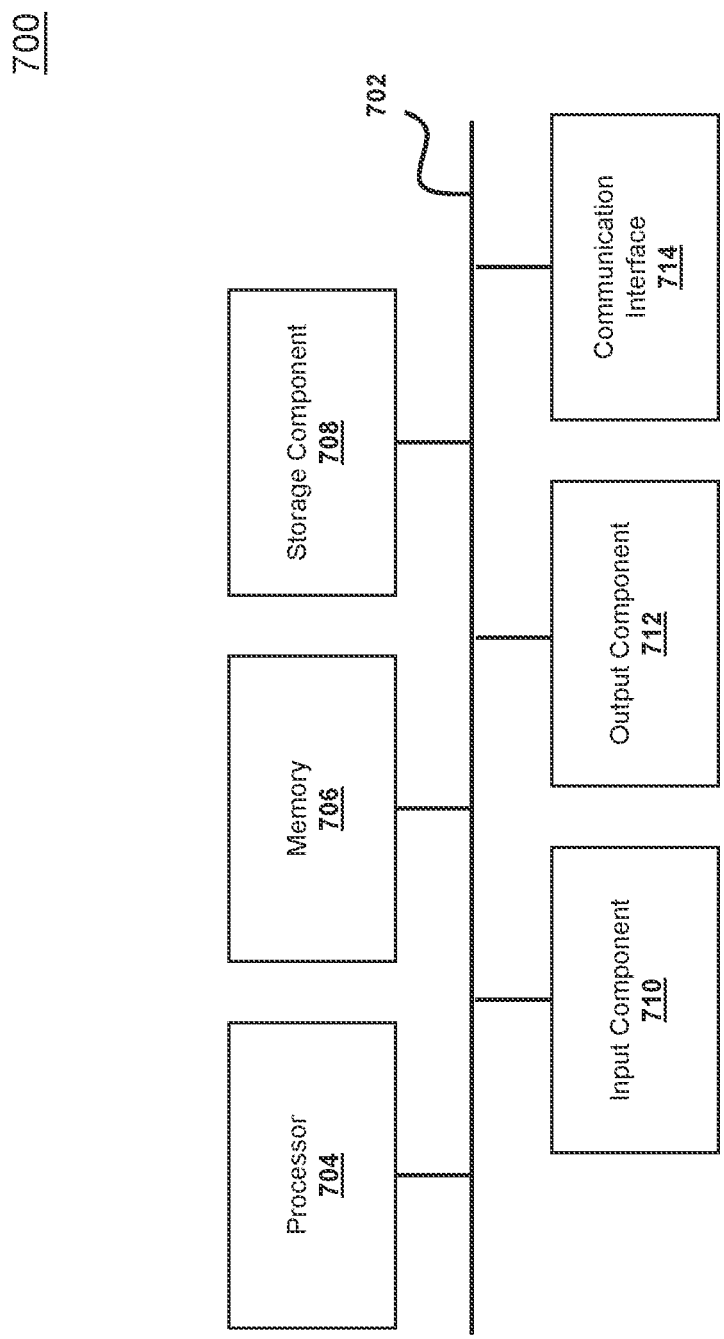

SYSTEM, METHOD, AND COMPUTER PROGRAM PRODUCT FOR EFFICIENTLY STORING MULTI-THREADED LOG DATA

BACKGROUND

1. Field

This disclosure relates generally to efficiently storing data and, in some non-limiting embodiments or aspects, systems, methods, and computer program products for efficiently storing multi-threaded log data.

2. Technical Considerations

Certain devices and/or systems generate logs (e.g., data records associated with respective events occurring). The logs from various devices and/or systems may be communicated to a repository and/or stored in the repository. For example, such logs may be stored in and/or accessible from a cloud repository (e.g., one or more servers that store the logs and are accessible over the internet). At least some of the logs may be useful, for example, for machine learning tasks, for auditing, for dispute resolution, for investigating past events that preceded (and/or may have contributed to) an event of interest, and/or the like.

However, storing large volumes of logs (e.g., from many devices and/or systems) may consume a large amount of computing resources (e.g., a large amount of memory; a large amount of processing resources for receiving, sorting, searching, etc.; and/or the like), which may result in wasted resources where not all of the logs are particularly relevant or useful. Additionally, while cloud repositories have certain advantages (e.g., convenience, data security, processing speed, and/or the like) compared to certain other types of repositories, cloud repositories may be relatively expensive and/or consume a relatively large amount of resources (e.g., power, computing resources, and/or the like) compared to other types of repositories, so wasted resources in a cloud repository may be especially problematic.

SUMMARY

Accordingly, it is an object of the present disclosure to provide systems, methods, and computer program products for efficiently storing multi-threaded log data that overcome some or all of the deficiencies identified above.

According to non-limiting embodiments or aspects, provided is a computer-implemented method for efficiently storing multi-threaded log data. An exemplary computer-implemented method for efficiently storing multi-threaded log data may include receiving multi-threaded log data including a plurality of logs, a plurality of markers, and a plurality of thread identifiers. Each respective log of the plurality of logs may be associated with a respective marker of the plurality of markers and a respective thread identifier of the plurality of thread identifiers. Each respective marker may indicate that the respective log is in a respective category of a plurality of categories. Each respective thread identifier may indicate that the respective log is associated with a respective thread of a plurality of threads. For each respective log of the plurality of logs, the respective thread identifier of the respective log may be set as a most recently used item in a thread reference cache. For each respective log, a respective log cache of a plurality of log caches in a map data structure may be determined based on the respective thread identifier for the respective log. A respective key for the map data structure may be based on the respective thread identifier, and the respective log cache may be a respective value associated with the respective key. For each respective log, the respective log may be added to the respective log cache in the map data structure. For each respective log, whether to communicate at least one of the respective log or the respective log cache to a first repository may be determined based on the respective marker for the respective log. For each respective log, the respective log may be communicated to a second repository. For each respective log, whether to remove an oldest log from the respective log cache may be determined based on at least one of a log cache size limit or a time limit. For each respective log, whether to remove a least recently used log cache from the map data structure may be determined based on at least one map data structure size limit, wherein the least recently used log cache is associated with a least recently used item in the thread reference cache.

In some non-limiting embodiments or aspects, the first repository may include a cloud repository. Additionally or alternatively, the second repository may include an internal repository.

In some non-limiting embodiments or aspects, the first repository may include a cache. Additionally or alternatively, the second repository may include a persistent storage database.

In some non-limiting embodiments or aspects, the first repository may include a high-performance repository. Additionally or alternatively, the second repository may include a low-performance repository.

In some non-limiting embodiments or aspects, the second repository may include a remote cache.

In some non-limiting embodiments or aspects, receiving the multi-threaded log data may include receiving the multi-threaded log data from a plurality of data generators. Each respective thread identifier may be associated with the respective thread from a respective data generator of the plurality of data generators.

In some non-limiting embodiments or aspects, for each respective log of the plurality of logs, the respective data generator of the plurality of data generators may set the respective marker based on the respective category of the respective log.

In some non-limiting embodiments or aspects, the plurality of categories may include a first category, a second category, and a third category. Determining whether to communicate at least one of the respective log or the respective log cache to the first repository may include determining to communicate the respective log cache to the first repository if the respective marker indicates that the respective log is in the first category, determining to communicate the respective log to the first repository if the respective marker indicates that the respective log is in the second category, or determining not to communicate the respective log or the respective log cache to the first repository if the respective log is in the third category.

In some non-limiting embodiments or aspects, determining whether to remove the oldest log from the respective log cache based on the at least one of the log cache size limit or the time limit may include determining that the oldest log from the respective log cache is older than the time limit, determining that a number of logs of the respective log cache is greater than the log cache size limit, and determining to remove the oldest log based on the oldest log being older than the time limit and the number of logs being greater than the log cache size limit.

In some non-limiting embodiments or aspects, the at least one map data structure size limit may include a lower map data structure size limit and a higher map data structure size limit. Determining whether to remove the least recently used log cache from the map data structure based on the at least one map data structure size limit may include determining that a number of log caches of the map data structure is greater than the higher map data structure size limit and determining to remove the least recently used log cache and each next least recently used log cache until the number of log caches of the map data structure is less than or equal to the lower map data structure size limit.

In some non-limiting embodiments or aspects, a first array is initially named a buffer array and a second array is initially named a transfer array. Receiving the multi-threaded log data may include receiving a first portion of the multi-threaded log data in the first array named the buffer array for a first buffer time period; after the first buffer time period, renaming the first array the transfer array and renaming the second array the buffer array; and receiving a second portion of the multi-threaded log data in the second array renamed the buffer array for a second buffer time period following the first buffer time period.

According to non-limiting embodiments or aspects, provided is a system for efficiently storing multi-threaded log data. An exemplary system for efficiently storing multi-threaded log data may include a first repository, a second repository, and a multi-threaded log system comprising a thread reference cache and a map data structure comprising a plurality of log caches. The multi-threaded log system may be configured to receive multi-threaded log data including a plurality of logs, a plurality of markers, and a plurality of thread identifiers. Each respective log of the plurality of logs may be associated with a respective marker of the plurality of markers and a respective thread identifier of the plurality of thread identifiers. Each respective marker may indicate that the respective log is in a respective category of a plurality of categories. Each respective thread identifier may indicate that the respective log is associated with a respective thread of a plurality of threads. For each respective log of the plurality of logs, the multi-threaded log system may be configured to set the respective thread identifier of the respective log as a most recently used item in the thread reference cache; to determine a respective log cache of the plurality of log caches in the map data structure based on the respective thread identifier for the respective log, wherein a respective key for the map data structure is based on the respective thread identifier, and wherein the respective log cache is a respective value associated with the respective key; to add the respective log to the respective log cache in the map data structure; to determine whether to communicate at least one of the respective log or the respective log cache to the first repository based on the respective marker for the respective log; to communicate the respective log to the second repository; to determine whether to remove an oldest log from the respective log cache based on at least one of a log cache size limit or a time limit; and to determine whether to remove a least recently used log cache from the map data structure based on at least one map data structure size limit, wherein the least recently used log cache is associated with a least recently used item in the thread reference cache.

In some non-limiting embodiments or aspects, the first repository may include a cloud repository. Additionally or alternatively, the second repository may include an internal repository.

In some non-limiting embodiments or aspects, the first repository may include a high-performance repository and the second repository may include a low-performance repository.

In some non-limiting embodiments or aspects, the second repository may include a remote cache.

In some non-limiting embodiments or aspects, the system may further include a plurality of data generators. Receiving the multi-threaded log data may include receiving the multi-threaded log data from the plurality of data generators. Each respective thread identifier may be associated with the respective thread from a respective data generator of the plurality of data generators. For each respective log of the plurality of logs, the respective data generator of the plurality of data generators may be configured to set the respective marker based on the respective category of the respective log.

In some non-limiting embodiments or aspects, the plurality of categories may include a first category, a second category, and a third category. Determining whether to communicate at least one of the respective log or the respective log cache to the first repository may include determining to communicate the respective log cache to the first repository if the respective marker indicates that the respective log is in the first category, determining to communicate the respective log to the first repository if the respective marker indicates that the respective log is in the second category, or determining not to communicate the respective log or the respective log cache to the first repository if the respective log is in the third category.

In some non-limiting embodiments or aspects, determining whether to remove the oldest log from the respective log cache based on the at least one of the log cache size limit or the time limit may include determining that the oldest log from the respective log cache is older than the time limit, determining that a number of logs of the respective log cache is greater than the log cache size limit, and determining to remove the oldest log based on the oldest log being older than the time limit and the number of logs being greater than the log cache size limit.

In some non-limiting embodiments or aspects, the at least one map data structure size limit may include a lower map data structure size limit and a higher map data structure size limit. Determining whether to remove the least recently used log cache from the map data structure based on the at least one map data structure size limit may include determining that a number of log caches of the map data structure is greater than the higher map data structure size limit and determining to remove the least recently used log cache and each next least recently used log cache until the number of log caches of the map data structure is less than or equal to the lower map data structure size limit.

In some non-limiting embodiments or aspects, the system may further include a first array initially named a buffer array and a second array initially named a transfer array. Receiving the multi-threaded log data may include receiving a first portion of the multi-threaded log data in the first array named the buffer array for a first buffer time period; after the first buffer time period, renaming the first array the transfer array and renaming the second array the buffer array; and receiving a second portion of the multi-threaded log data in the second array renamed the buffer array for a second buffer time period following the first buffer time period.

According to non-limiting embodiments or aspects, provided is a computer program product for efficiently storing multi-threaded log data. An exemplary computer program product for efficiently storing multi-threaded log data may include one or more instructions that, when executed by at least one processor, cause the at least one processor to: receive multi-threaded log data including a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories, each respective thread identifier indicating that the respective log is associated with a respective thread of a plurality of threads; for each respective log of the plurality of logs: set the respective thread identifier of the respective log as a most recently used item in a thread reference cache; determine a respective log cache of a plurality of log caches in a map data structure based on the respective thread identifier for the respective log, wherein a respective key for the map data structure is based on the respective thread identifier, and wherein the respective log cache is a respective value associated with the respective key; add the respective log to the respective log cache in the map data structure; determine whether to communicate at least one of the respective log or the respective log cache to a first repository based on the respective marker for the respective log; communicate the respective log to a second repository; determine whether to remove an oldest log from the respective log cache based on at least one of a log cache size limit or a time limit; and determine whether to remove a least recently used log cache from the map data structure based on at least one map data structure size limit, wherein the least recently used log cache is associated with a least recently used item in the thread reference cache.

Other non-limiting embodiments or aspects will be set forth in the following numbered clauses:

Clause 1: A computer-implemented method, comprising: receiving, with at least one processor, multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories, each respective thread identifier indicating that the respective log is associated with a respective thread of a plurality of threads; for each respective log of the plurality of logs: setting, with at least one processor, the respective thread identifier of the respective log as a most recently used item in a thread reference cache; determining, with at least one processor, a respective log cache of a plurality of log caches in a map data structure based on the respective thread identifier for the respective log, wherein a respective key for the map data structure is based on the respective thread identifier, and wherein the respective log cache is a respective value associated with the respective key; adding, with at least one processor, the respective log to the respective log cache in the map data structure; determining, with at least one processor, whether to communicate at least one of the respective log or the respective log cache to a first repository based on the respective marker for the respective log; communicating, with at least one processor, the respective log to a second repository; determining, with at least one processor, whether to remove an oldest log from the respective log cache based on at least one of a log cache size limit or a time limit; and determining, with at least one processor, whether to remove a least recently used log cache from the map data structure based on at least one map data structure size limit, wherein the least recently used log cache is associated with a least recently used item in the thread reference cache.

Clause 2: The computer-implemented method of clause 1, wherein the first repository comprises a cloud repository, and wherein the second repository comprises an internal repository.

Clause 3: The computer-implemented method of any preceding clause, wherein the first repository comprises a cache, and wherein the second repository comprises a persistent storage database.

Clause 4: The computer-implemented method of any preceding clause, wherein the first repository comprises a high-performance repository and the second repository comprises a low-performance repository.

Clause 5: The computer-implemented method of any preceding clause, wherein the second repository comprises a remote cache.

Clause 6: The computer-implemented method of any preceding clause, wherein receiving the multi-threaded log data comprises receiving the multi-threaded log data from a plurality of data generators, each respective thread identifier associated with the respective thread from a respective data generator of the plurality of data generators.

Clause 7: The computer-implemented method of any preceding clause, wherein, for each respective log of the plurality of logs, the respective data generator of the plurality of data generators sets the respective marker based on the respective category of the respective log.

Clause 8: The computer-implemented method of any preceding clause, wherein the plurality of categories comprises a first category, a second category, and a third category, and wherein determining whether to communicate at least one of the respective log or the respective log cache to the first repository comprises: determining to communicate the respective log cache to the first repository if the respective marker indicates that the respective log is in the first category; determining to communicate the respective log to the first repository if the respective marker indicates that the respective log is in the second category; or determining not to communicate the respective log or the respective log cache to the first repository if the respective log is in the third category.

Clause 9: The computer-implemented method of any preceding clause, wherein determining whether to remove the oldest log from the respective log cache based on the at least one of the log cache size limit or the time limit comprises: determining that the oldest log from the respective log cache is older than the time limit; determining that a number of logs of the respective log cache is greater than the log cache size limit; and determining to remove the oldest log based on the oldest log being older than the time limit and the number of logs being greater than the log cache size limit.

Clause 10: The computer-implemented method of any preceding clause, wherein the at least one map data structure size limit comprises a lower map data structure size limit and a higher map data structure size limit, and wherein determining whether to remove the least recently used log cache from the map data structure based on the at least one map data structure size limit comprises: determining that a number of log caches of the map data structure is greater than the higher map data structure size limit; and determining to remove the least recently used log cache and each next least recently used log cache until the number of log caches of the map data structure is less than or equal to the lower map data structure size limit.

Clause 11: The computer-implemented method of any preceding clause, wherein a first array is initially named a buffer array and wherein a second array is initially named a transfer array, and wherein receiving the multi-threaded log data comprises: receiving a first portion of the multi-threaded log data in the first array named the buffer array for a first buffer time period; after the first buffer time period, renaming the first array the transfer array and renaming the second array the buffer array; and receiving a second portion of the multi-threaded log data in the second array renamed the buffer array for a second buffer time period following the first buffer time period.

Clause 12: A system, comprising: a first repository; a second repository; and a multi-threaded log system comprising a thread reference cache and a map data structure comprising a plurality of log caches, the multi-threaded log system configured to: receive multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories, each respective thread identifier indicating that the respective log is associated with a respective thread of a plurality of threads; for each respective log of the plurality of logs: set the respective thread identifier of the respective log as a most recently used item in the thread reference cache; determine a respective log cache of the plurality of log caches in the map data structure based on the respective thread identifier for the respective log, wherein a respective key for the map data structure is based on the respective thread identifier, and wherein the respective log cache is a respective value associated with the respective key; add the respective log to the respective log cache in the map data structure; determine whether to communicate at least one of the respective log or the respective log cache to the first repository based on the respective marker for the respective log; communicate the respective log to the second repository; determine whether to remove an oldest log from the respective log cache based on at least one of a log cache size limit or a time limit; and determine whether to remove a least recently used log cache from the map data structure based on at least one map data structure size limit, wherein the least recently used log cache is associated with a least recently used item in the thread reference cache.

Clause 13: The system of clause 12, wherein the first repository comprises a cloud repository, and wherein the second repository comprises an internal repository.

Clause 14: The system of clause 12 or 13, wherein the first repository comprises a high-performance repository and the second repository comprises a low-performance repository.

Clause 15: The system of any one of clauses 12-14, wherein the second repository comprises a remote cache.

Clause 16: The system of any one of clauses 12-15, further comprising a plurality of data generators, wherein receiving the multi-threaded log data comprises receiving the multi-threaded log data from the plurality of data generators, each respective thread identifier associated with the respective thread from a respective data generator of the plurality of data generators, and wherein, for each respective log of the plurality of logs, the respective data generator of the plurality of data generators is configured to set the respective marker based on the respective category of the respective log.

Clause 17: The system of any one of clauses 12-16, wherein the plurality of categories comprises a first category, a second category, and a third category, and wherein determining whether to communicate at least one of the respective log or the respective log cache to the first repository comprises: determining to communicate the respective log cache to the first repository if the respective marker indicates that the respective log is in the first category; determining to communicate the respective log to the first repository if the respective marker indicates that the respective log is in the second category; or determining not to communicate the respective log or the respective log cache to the first repository if the respective log is in the third category.

Clause 18: The system of any one of clauses 12-17, wherein determining whether to remove the oldest log from the respective log cache based on the at least one of the log cache size limit or the time limit comprises: determining that the oldest log from the respective log cache is older than the time limit; determining that a number of logs of the respective log cache is greater than the log cache size limit; and determining to remove the oldest log based on the oldest log being older than the time limit and the number of logs being greater than the log cache size limit, wherein the at least one map data structure size limit comprises a lower map data structure size limit and a higher map data structure size limit, and wherein determining whether to remove the least recently used log cache from the map data structure based on the at least one map data structure size limit comprises: determining that a number of log caches of the map data structure is greater than the higher map data structure size limit; and determining to remove the least recently used log cache and each next least recently used log cache until the number of log caches of the map data structure is less than or equal to the lower map data structure size limit.

Clause 19: The system of any one of clauses 12-18, further comprising: a first array initially named a buffer array; and a second array initially named a transfer array, wherein receiving the multi-threaded log data comprises: receiving a first portion of the multi-threaded log data in the first array named the buffer array for a first buffer time period; after the first buffer time period, renaming the first array the transfer array and renaming the second array the buffer array; and receiving a second portion of the multi-threaded log data in the second array renamed the buffer array for a second buffer time period following the first buffer time period.

Clause 20: A computer program product comprising at least one non-transitory computer-readable medium including one or more instructions that, when executed by at least one processor, cause the at least one processor to: receive multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories, each respective thread identifier indicating that the respective log is associated with a respective thread of a plurality of threads; for each respective log of the plurality of logs: set the respective thread identifier of the respective log as a most recently used item in a thread reference cache; determine a respective log cache of a plurality of log caches in a map data structure based on the respective thread identifier for the respective log, wherein a respective key for the map data structure is based on the respective thread identifier, and wherein the respective log cache is a respective value associated with the respective key; add the respective log to the respective log cache in the map data structure; determine whether to communicate at least one of the respective log or the respective log cache to a first repository based on the respective marker for the respective log; communicate the respective log to a second repository; determine whether to remove an oldest log from the respective log cache based on at least one of a log cache size limit or a time limit; and determine whether to remove a least recently used log cache from the map data structure based on at least one map data structure size limit, wherein the least recently used log cache is associated with a least recently used item in the thread reference cache.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 7 illustrates example components of a device used in connection with non-limiting embodiments or aspects.

DESCRIPTION OF THE PREFERRED EMBODIMENTS

Figure 1A:
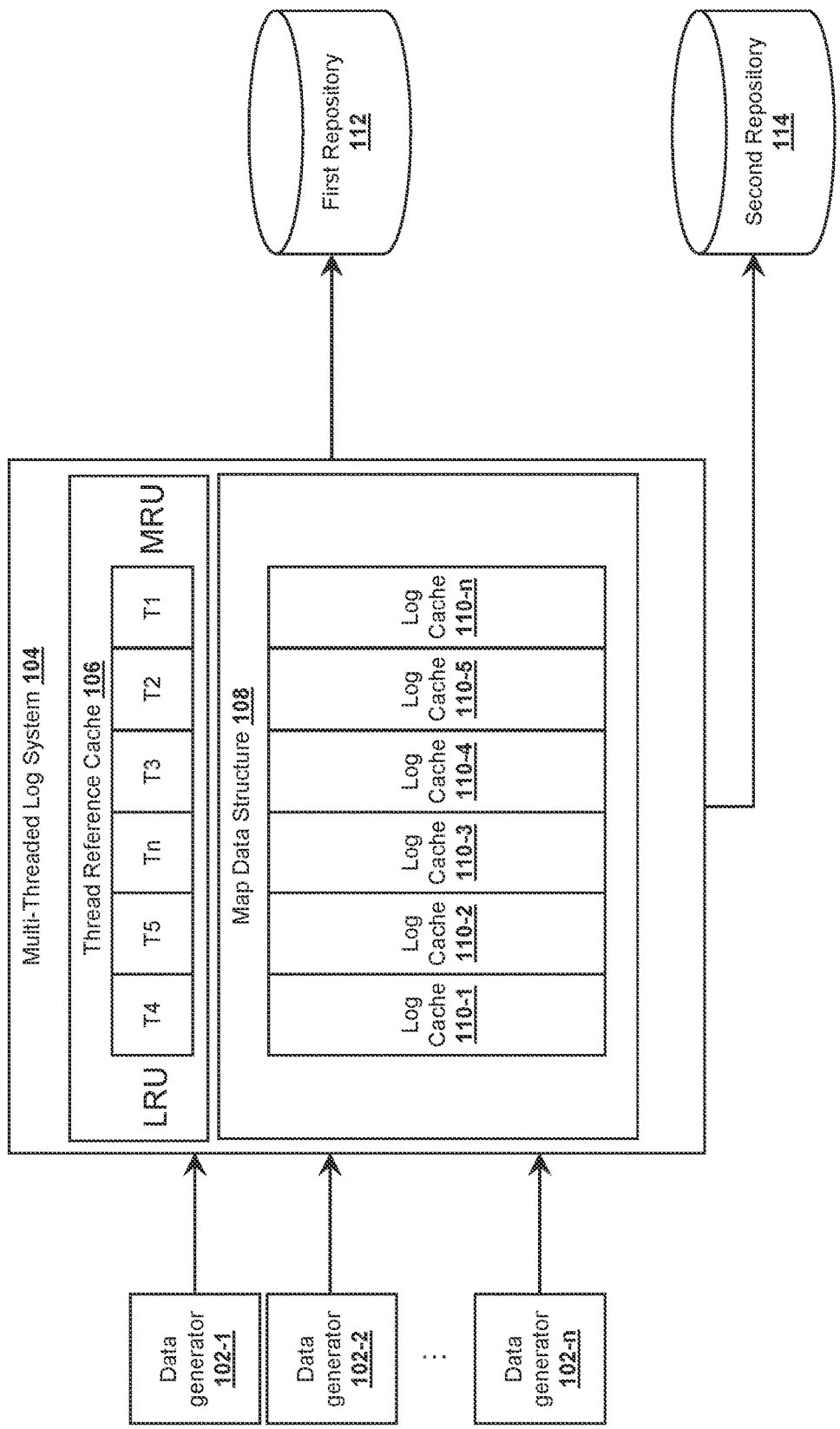
FIGS. 1A-1C are schematic diagrams of systems for efficiently storing multi-threaded log data according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments of the disclosed subject matter are directed to systems, methods, and computer program products for efficiently storing multi-threaded log data. For example, non-limiting embodiments or aspects of the disclosed subject matter provide receiving multi-threaded log data comprising a plurality of logs, a plurality of markers, and a plurality of thread identifiers, and each respective log may be associated with a respective marker and a respective thread identifier. Each respective marker may indicate that the respective log is in a respective category of a plurality of categories, and each respective thread identifier may indicate that the respective log is associated with a respective thread of a plurality of threads. For each respective log, the respective thread identifier may be set as a most recently used item in a thread reference cache, a respective log cache of a plurality of log caches in a map data structure may be determined based on the respective thread identifier (e.g., a respective key for the map data structure may be based on the respective thread identifier, and the respective log cache may be a respective value associated with the respective key), the respective log may be added to the respective log cache, whether to communicate the respective log and/or the respective log cache to a first repository (e.g., a cloud repository) may be determined based on the respective marker, the respective log may be communicated to a second repository (e.g., a backup repository), whether to remove an oldest log from the respective log cache may be determined based on at least one of a log cache size limit or a time limit, and whether to remove a least recently used log cache (e.g., associated with a least recently used item in the thread reference cache) from the map data structure may be determined based on at least one map data structure size limit. Such embodiments provide techniques and systems that provide improved efficiency of storing and organizing log data in a multi-threaded environment because only relevant data (e.g., the entire log cache for a first category or just the log for a second category) is communicated to/stored in the first repository, while less relevant data (e.g., a third category) is temporarily stored in the map data structure/log cache and backed up in the second repository. As such, wasted resources are reduced for the first repository, which may be a cloud repository (e.g., that is relatively expensive and/or consumes a relatively large amount of resources), while the advantages of the first (e.g., cloud) repository (e.g., convenience, data security, processing speed, and/or the like) are applicable to the logs that are most relevant. Additionally, due to the map data structure, the thread reference cache, the log cache size limit(s), the time limit(s), and/or the map data structure size limit(s), the most recent logs from the most recent threads may be efficiently stored in the high speed cache memory, while older logs and/or older threads are backed up in the second repository. Additionally, non-limiting embodiments or aspects of the disclosed subject matter provide a first array initially named a buffer array and a second array initially named a transfer array so that multi-threaded log data may be received at the buffer array for a time period and then the names of the arrays may be switched so that the second array (renamed as the buffer array) can receive incoming multi-threaded log data while the first array (renamed the transfer array) may transfer the previously received multi-threaded log data (e.g., received during the time period) to the respective log cache(s) in the map data structure. As such, the number of locks and unlocks used to write the multi-threaded log data to the respective log cache(s) may be reduced. Therefore, the accuracy may be balanced with latency and usage of computing resources, for example, because lock and unlock operations may be relatively time consuming and require computing resources, and by temporarily storing the incoming multi-threaded log data in the array for a short time period (and, therefore, slightly reducing the accuracy of the log caches since incoming data is not written to the log cache for the short time period), the latency and usage of computing resources may be significantly reduced, which may be a desirable tradeoff, especially if the time period is small.

Figure 1B:
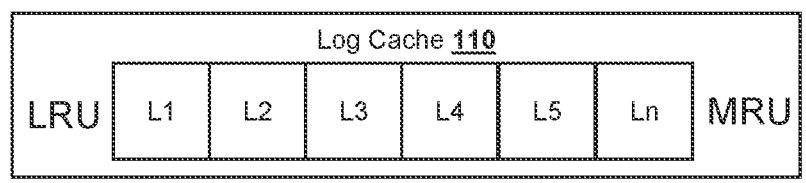
Figure 1C:
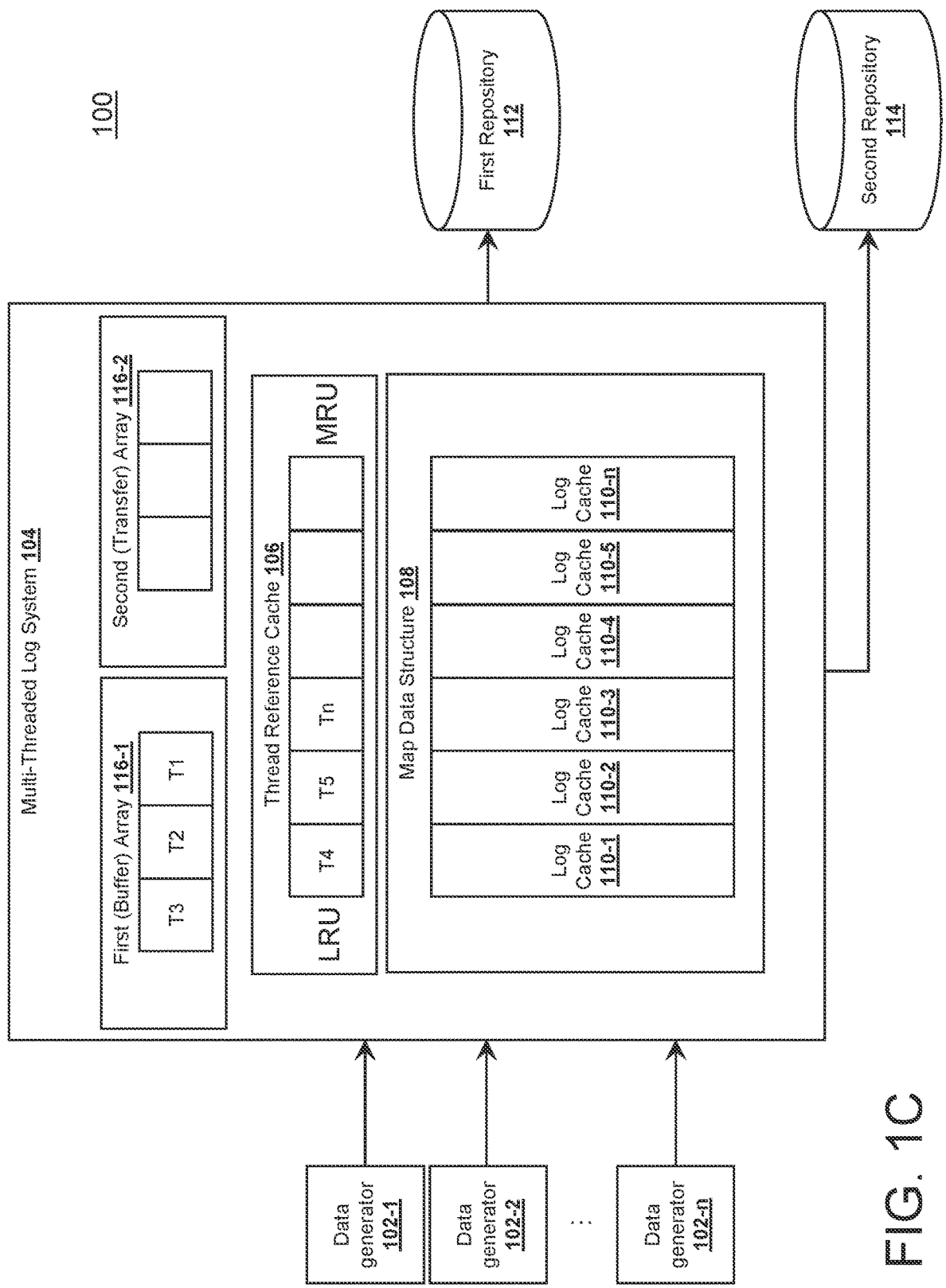

FIGS. 1A-1C depict a system 100 for efficiently storing multi-threaded log data according to some non-limiting embodiments or aspects. System 100 may include data generators 102-1 through 102-n (referred to collectively as "data generators 102," and individually as "data generator 102"), multi-threaded log system 104 (e.g., which may include thread reference cache 106, map data structure 108, log caches 110-1 through 110-n (referred to collectively as "log caches 110," and individually as "log cache 110"), first array 116-1, and/or second array 116-2), first repository 112, and/or second repository 114.

Data generator 102 may include one or more devices capable of receiving information from and/or communicating information to multi-threaded log system 104 (e.g., via a communication network, an ad hoc network, a local network, a private network, a virtual private network, and/or any other suitable communication technique). Additionally or alternatively, each data generator 102 may include a device capable of receiving information from and/or communicating information to other data generators 102 (e.g., via a communication network, an ad hoc network, a local network, a private network, a virtual private network, and/or any other suitable communication technique). In some non-limiting embodiments or aspects, data generator 102 may include a computing device, such as a computer, a mobile device, a wearable device, a server, a group of servers, and/or other like devices. For example, data generator 102 may include a client device and/or the like. In some non-limiting embodiments or aspects, data generator 102 may or may not be capable of receiving information (e.g., from multi-threaded log system 104 and/or from another data generator 102) via a short-range wireless communication connection (e.g., an NFC communication connection, an RFID communication connection, a Bluetooth® communication connection, a Zigbee® communication connection, and/or the like), and/or communicating information (e.g., to multi-threaded log system 104 and/or from another data generator 102) via a short-range wireless communication connection. In some non-limiting embodiments or aspects, each respective data generator 102 may generate respective log data including at least one log (e.g., a data record associated with a respective event occurring). Each respective data generator 102 may have at least one respective thread identifier associated therewith, and the log(s) generated by the respective data generator 102 may be associated with the respective thread identifier (e.g., the respective thread identifier may indicate that the respective log is associated with a respective thread associated with that respective data generator 102). Additionally, each data generator 102 may generate a marker associated with each log. For example, each respective marker may indicate that the respective log is in a respective category of a plurality of categories. In some non-limiting embodiments or aspects, multi-threaded log data may include the plurality of logs (e.g., from a plurality of data generators 102) and the respective markers and respective thread identifiers associated with the logs.

Multi-threaded log system 104 may include one or more devices capable of receiving information from and/or communicating information to data generator 102, first repository 112, second repository 114, and/or the like (e.g., via a communication network, an ad hoc network, a local network, a private network, a virtual private network, and/or any other suitable communication technique). For example, multi-threaded log system 104 may include a computing device, such as a server, a group of servers, and/or other like devices. In some non-limiting embodiments or aspects, multi-threaded log system 104 may be associated with a transaction service provider, as described herein. In some non-limiting embodiments or aspects, multi-threaded log system 104 may include thread reference cache 106, map data structure 108, log caches 110, first array 116-1, second array 116-2, and/or the like. In some-non-limiting embodiments or aspects, thread reference cache 106 may include at least one cache memory (or a portion of a cache memory), such as a least recently used (LRU) cache memory and/or the like. In some non-limiting embodiments or aspects, map data structure 108 may include a plurality of log caches 110. For example, each respective key for the map data structure may be based on a respective thread identifier, and/or each respective log cache 110 (and/or a memory location thereof in the cache memory) may be a respective value associated with the respective key. In some non-limiting embodiments or aspects, each log cache 110 may include at least one cache memory (or a portion of a cache memory), such as an LRU cache memory and/or the like. In some non-limiting embodiments or aspects, each of first array 116-1 and second array 116-2 may include a cache memory (or a portion of a cache memory), a buffer, and/or other suitable memory (or portion thereof).

First repository 112 may include one or more devices capable of receiving information from and/or communicating information to multi-threaded log system 104 (e.g., via a communication network, an ad hoc network, a local network, a private network, a virtual private network, and/or any other suitable communication technique). For example, first repository 112 may include a computing device, such as a server, a group of servers, and/or other like devices. In some non-limiting embodiments or aspects, first repository 112 may be associated with a transaction service provider, as described herein. In some non-limiting embodiments or aspects, first repository 112 may be in communication with a data storage device, which may be local or remote to first repository 112. In some non-limiting embodiments or aspects, first repository 112 may be capable of receiving information from, storing information in, communicating information to, or searching information stored in the data storage device. In some non-limiting embodiments or aspects, first repository 112 may include at least one of a cloud repository, a cache, a high-performance repository (e.g., a high-speed cache memory and/or the like), and/or the like.

Second repository 114 may include one or more devices capable of receiving information from and/or communicating information to multi-threaded log system 104 (e.g., via a communication network, an ad hoc network, a local network, a private network, a virtual private network, and/or any other suitable communication technique). For example, second repository 114 may include a computing device, such as a server, a group of servers, and/or other like devices. In some non-limiting embodiments or aspects, second repository 114 may be associated with a transaction service provider, as described herein. In some non-limiting embodiments or aspects, second repository 114 may be in communication with a data storage device, which may be local or remote to second repository 114. In some non-limiting embodiments or aspects, second repository 114 may be capable of receiving information from, storing information in, communicating information to, or searching information stored in the data storage device. In some non-limiting embodiments or aspects, second repository 114 may include at least one of an internal repository, a persistent storage database, a low-performance repository (e.g., a low-speed memory, data storage, and/or the like), a remote cache, and/or the like.

The number and arrangement of systems and devices shown in FIGS. 1A-1C are provided as an example. There may be additional systems and/or devices, fewer systems and/or devices, different systems and/or devices, and/or differently arranged systems and/or devices than those shown in FIGS. 1A-1C. Furthermore, two or more systems or devices shown in FIGS. 1A-1C may be implemented within a single system or device, or a single system or device shown in FIGS. 1A-1C may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
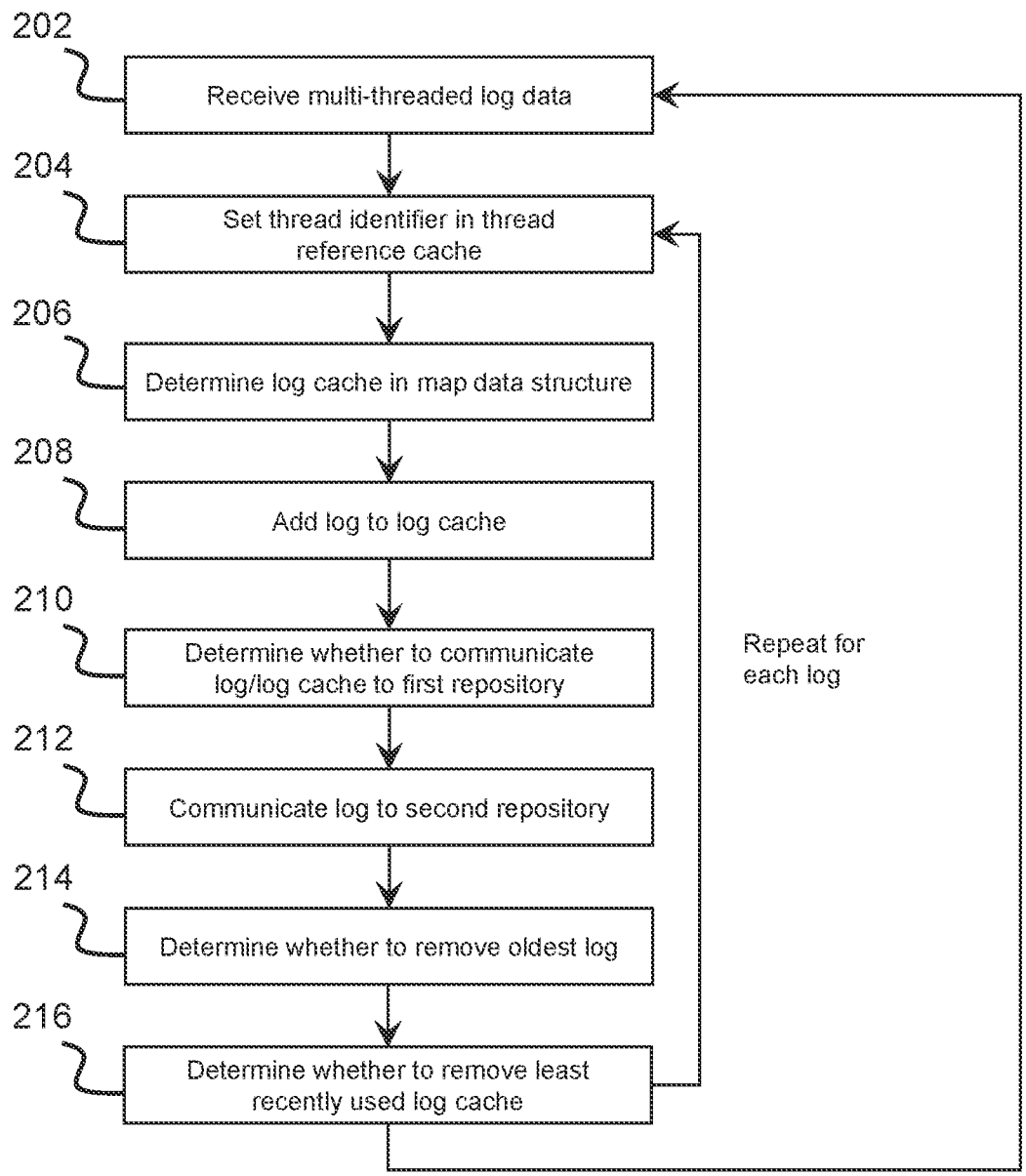
FIG. 2 is a flow diagram for a method of efficiently storing multi-threaded log data according to some non-limiting embodiments or aspects.

Referring now to FIG. 2, shown is a process 200 for efficiently storing multi-threaded log data according to some non-limiting embodiments or aspects. The steps shown in FIG. 2 are for example purposes only. It will be appreciated that additional, fewer, different, and/or a different order of steps may be used in non-limiting embodiments or aspects.

As shown in FIG. 2, at step 202, process 200 may include receiving multi-threaded log data. For example, multi-threaded log system 104 may receive multi-threaded log data from a plurality of data generators 102. In some non-limiting embodiments or aspects, the multi-threaded log data may include a plurality of logs, a plurality of markers, and a plurality of thread identifiers. Each respective log of the plurality of logs may be associated with a respective marker of the plurality of markers and a respective thread identifier of the plurality of thread identifiers. Each respective marker may indicate that the respective log is in a respective category of a plurality of categories. Each respective thread identifier may indicate that the respective log is associated with a respective thread of a plurality of threads.

In some non-limiting embodiments or aspects, each respective thread identifier may be associated with the respective thread from a respective data generator 102.

In some non-limiting embodiments or aspects, for each respective log, the respective data generator 102 may set the respective marker based on the respective category of the respective log. For the purpose of illustration, further details regarding exemplary categories, according to some non-limiting embodiments or aspects, are discussed below with respect to FIG. 3.

In some non-limiting embodiments or aspects, multi-threaded log system 104 may include first array 116-1 and second array 116-2. For example, first array 116-1 initially may be named a buffer array, and second array 116-2 initially may be named a transfer array. Receiving the multi-threaded log data may include receiving a first portion of the multi-threaded log data in the buffer array (e.g., first array 116-1) for a first buffer time period. After the first buffer time period, first array 116-1 may be renamed the transfer array, and second array 116-2 may be renamed the buffer array. Thereafter, a second portion of the multi-threaded log data may be received in the buffer array (e.g., second array 116-2, which has now been renamed the buffer array) for a second buffer time period following the first buffer time period. Meanwhile, the first portion of the multi-threaded log data may be transferred from the transfer array (e.g., first array 116-2, which has now been renamed the transfer array) to the respective log cache 110 (e.g., added to the respective log cache 110), as described herein.

After the second buffer time period, the arrays may once again be renamed (e.g., first array 116-1 may be renamed the buffer array, and second array 116-2 may be renamed the transfer array), and the process of receiving incoming multi-threaded log data by the buffer array while transferring previously received multi-threaded log data from the transfer array and then renaming the arrays may be repeated (e.g., continuously, until the multi-threaded log data is discontinued, and/or the like). For the purpose of illustration, further details regarding receiving multi-threaded log data, according to some non-limiting embodiments or aspects, are shown in FIGS. 5A-5C.

As shown in FIG. 2, at step 204, process 200 may include setting a thread identifier in a thread reference cache. For example, for each respective log of the multi-threaded log data, multi-threaded log system 104 may set the respective thread identifier of the respective log as a most recently used (MRU) item in thread reference cache 106.

For example, as shown in FIG. 1A, multi-threaded log data may include a first log from a fourth thread (e.g., thread identifier T4), and multi-threaded log system 104 initially may set T4 as the most recently used item in thread reference cache 106. Additionally, multi-threaded log data may include a second log from a fifth thread (T5), and multi-threaded log system 104 may set T5 as the most recently used item in thread reference cache 106, and T4 may be shifted one position (e.g., in the direction of the least recently used item in thread reference cache 106). Multi-threaded log data may include a third log from an nth thread (Tn), a fourth log from a third thread (T3), a fifth log from a second thread (T2), and a sixth log from a first thread (T1), each of which multi-threaded log system 104 may successively set as the most recently used item in thread reference cache 106, while the previously received logs are shifted (e.g., the final order may be T1, T2, T3, Tn, T5, T4, from most recently used to least recently used).

Figure 5A:
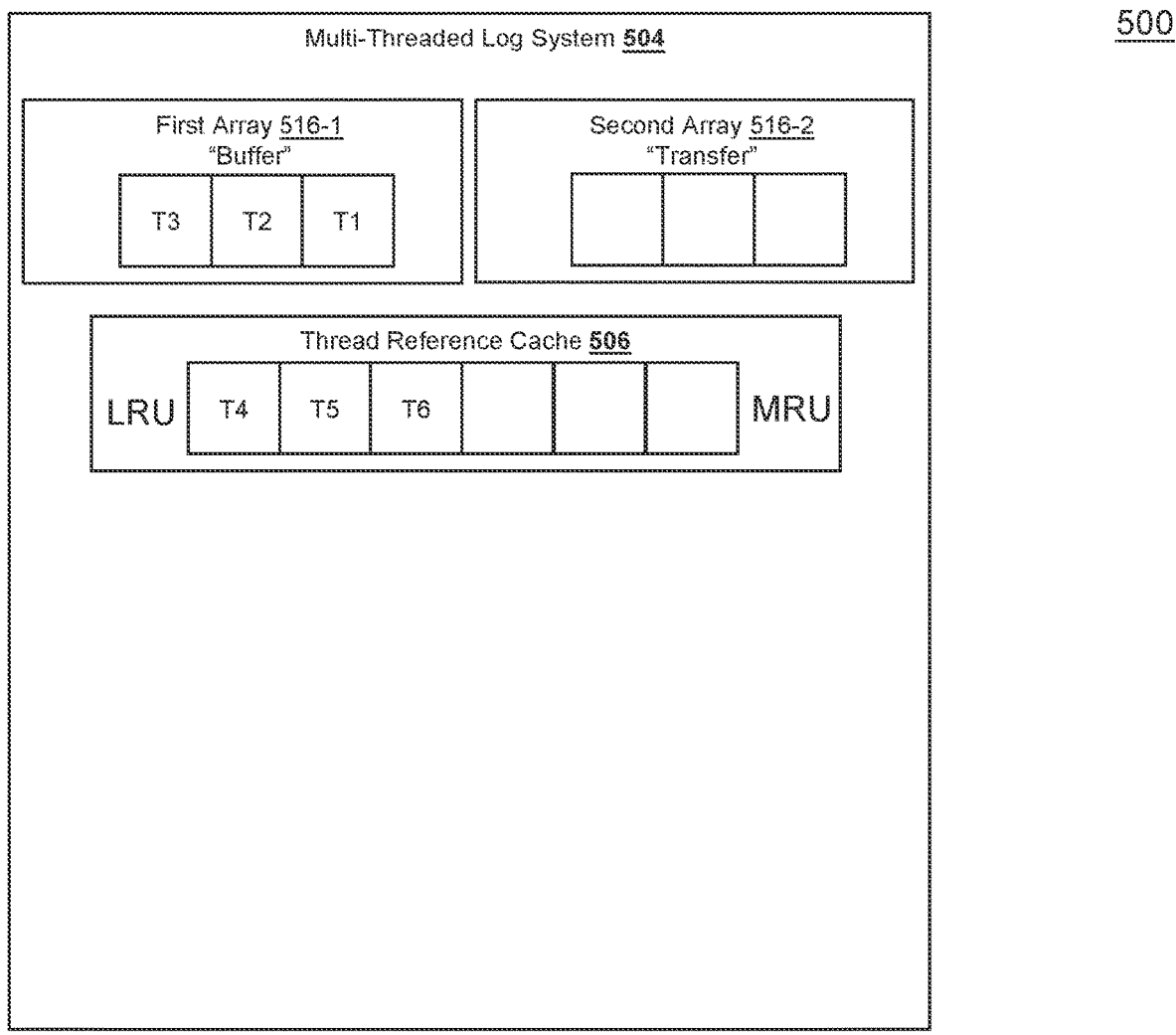
FIGS. 5A-5C are schematic diagrams of an exemplary implementation of a method of efficiently storing multi-threaded log data according to some non-limiting embodiments or aspects.
Figure 5B:
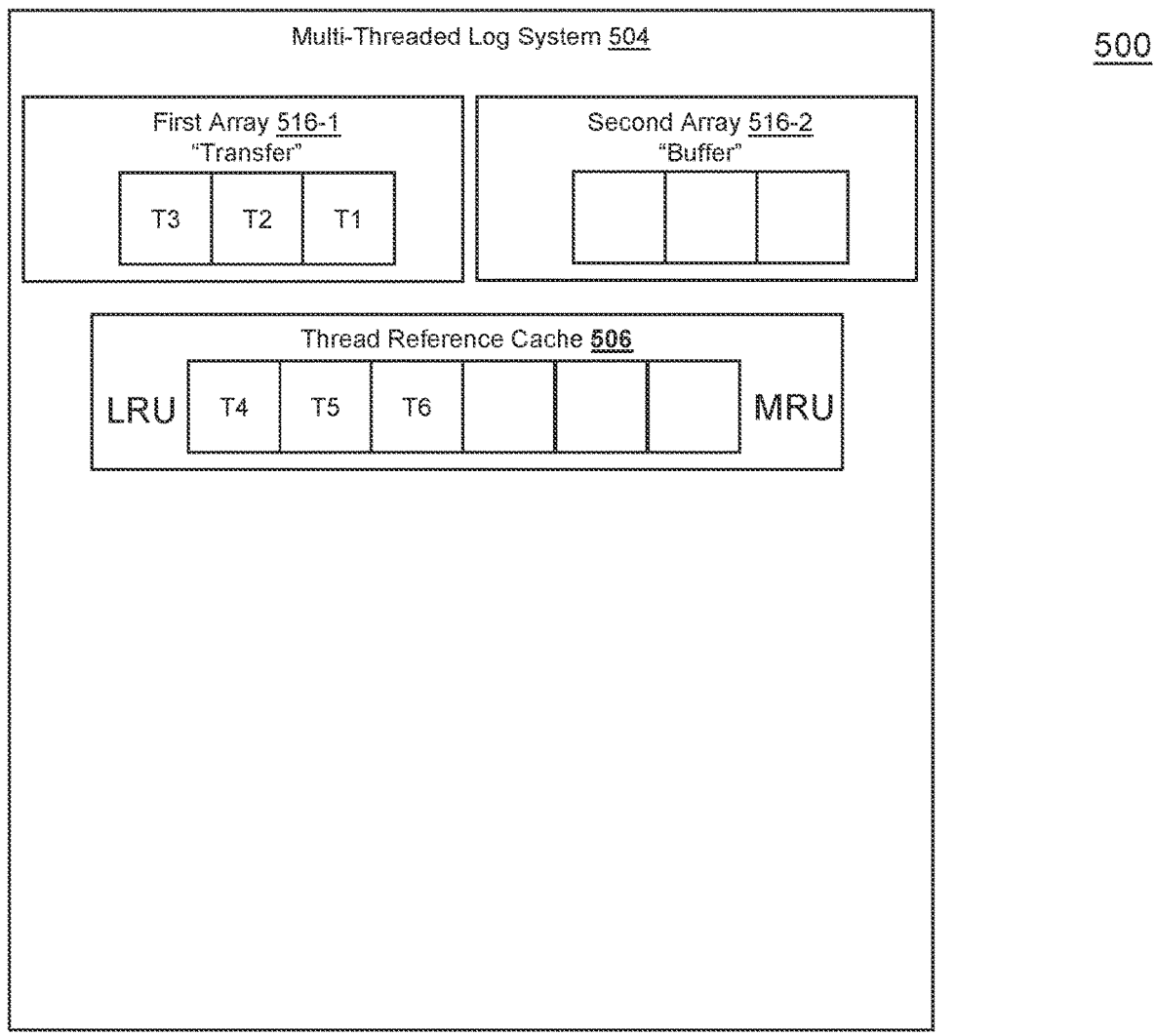
Figure 5C:
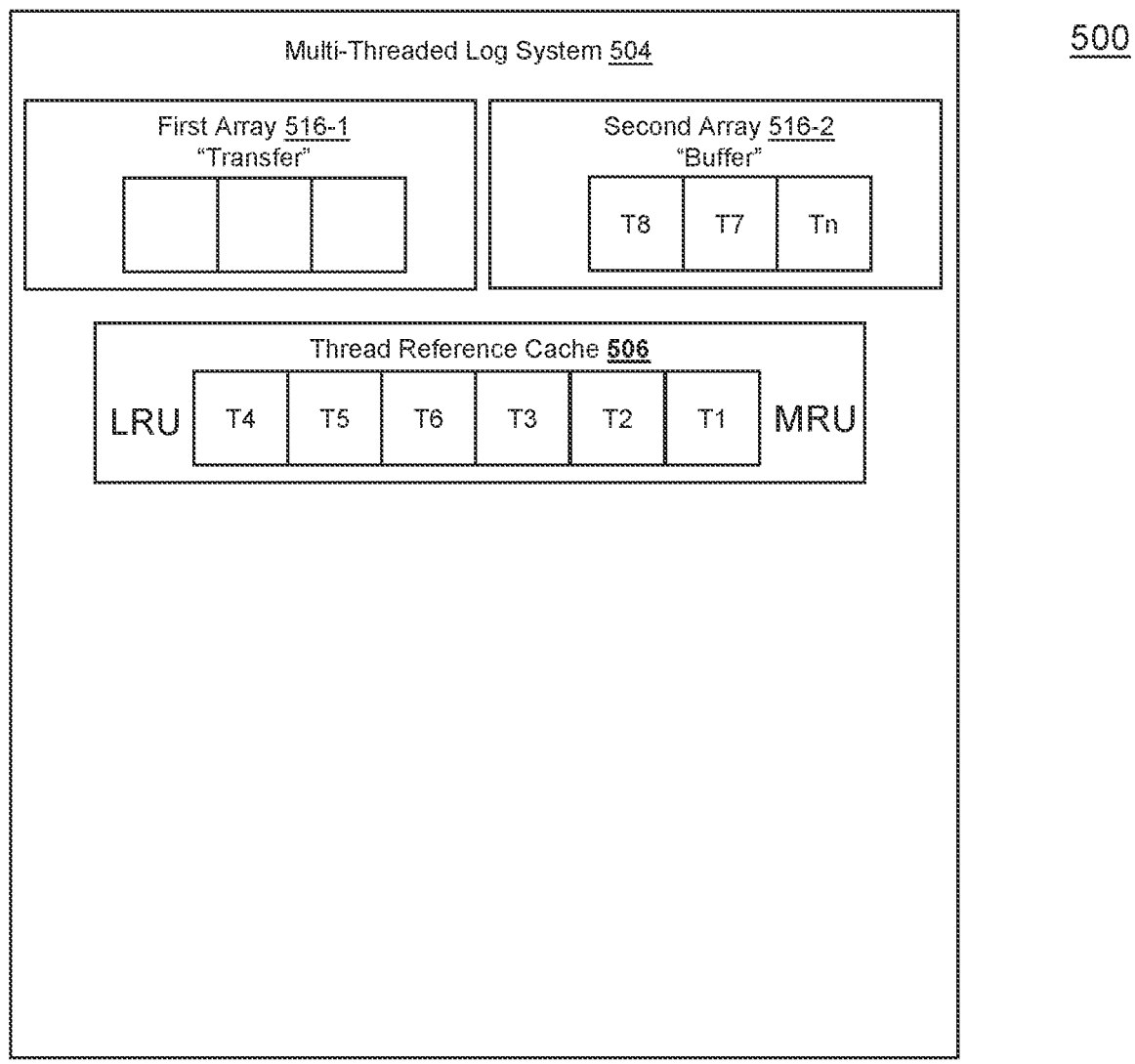

For the purpose of illustration, further details regarding setting the thread identifier in the thread reference cache, according to some non-limiting embodiments or aspects, are shown in FIGS. 5A-5C.

As shown in FIG. 2, at step 206, process 200 may include determining a log cache in a map data structure. For example, for each respective log of the multi-threaded log data, multi-threaded log system 104 may determine a respective log cache 110 in map data structure 108 based on the respective thread identifier for the respective log. In some non-limiting embodiments or aspects, a respective key for map data structure 108 may be based on the respective thread identifier, and the respective log cache 110 (and/or a memory location thereof in a cache memory) may be a respective value associated with the respective key.

In some non-limiting embodiments or aspects, if a respective log cache 110 associated with the respective thread identifier does not yet exist in map data structure 108 (e.g., if the respective log is the first log received from the respective thread and/or the like), multi-threaded log system 108 may generate a new log cache 110 in map data structure 108 associated with the respective thread identifier.

As shown in FIG. 2, at step 208, process 200 may include adding a log to the log cache. For example, for each respective log of the multi-threaded log data, multi-threaded log system 104 may add the respective log to the respective log cache 110 in map data structure 108.

As shown in FIG. 2, at step 210, process 200 may include determining whether to communicate the log and/or the log cache to a first repository. For example, for each respective log of the multi-threaded log data, multi-threaded log system 104 may determine whether to communicate at least one of the respective log or the respective log cache 110 (e.g., including the respective log and any previously received logs from the respective thread stored in the respective log cache 110) to first repository 112 based on the respective marker for the respective log.

In some non-limiting embodiments or aspects, first repository 112 may include a cloud repository, and second repository 114 may include an internal repository. In some non-limiting embodiments or aspects, first repository 112 may include a cache, and second repository 114 may include a persistent storage database. In some non-limiting embodiments or aspects, first repository 112 may include a high-performance repository, and second repository 114 may include a low-performance repository. In some non-limiting embodiments or aspects, first repository 112 may include a local and/or highly accessible cache, and second repository 114 may include a remote cache.

In some non-limiting embodiments or aspects, the plurality of categories may include a first category, a second category, and a third category. Additionally, determining whether to communicate at least one of the respective log or the respective log cache to first repository 112 may include determining (e.g., by multi-threaded log system 104) to communicate the respective log cache 110 (e.g., the respective log and any previously received logs from the respective thread stored in the respective log cache) to first repository 112 if the respective marker indicates that the respective log is in the first category, determining (e.g., by multi-threaded log system 104) to communicate the respective log to first repository 112 if the respective marker indicates that the respective log is in the second category, or determining (e.g., by multi-threaded log system 104) not to communicate the respective log or the respective log cache to the first repository if the respective log is in the third category.

Figure 3:
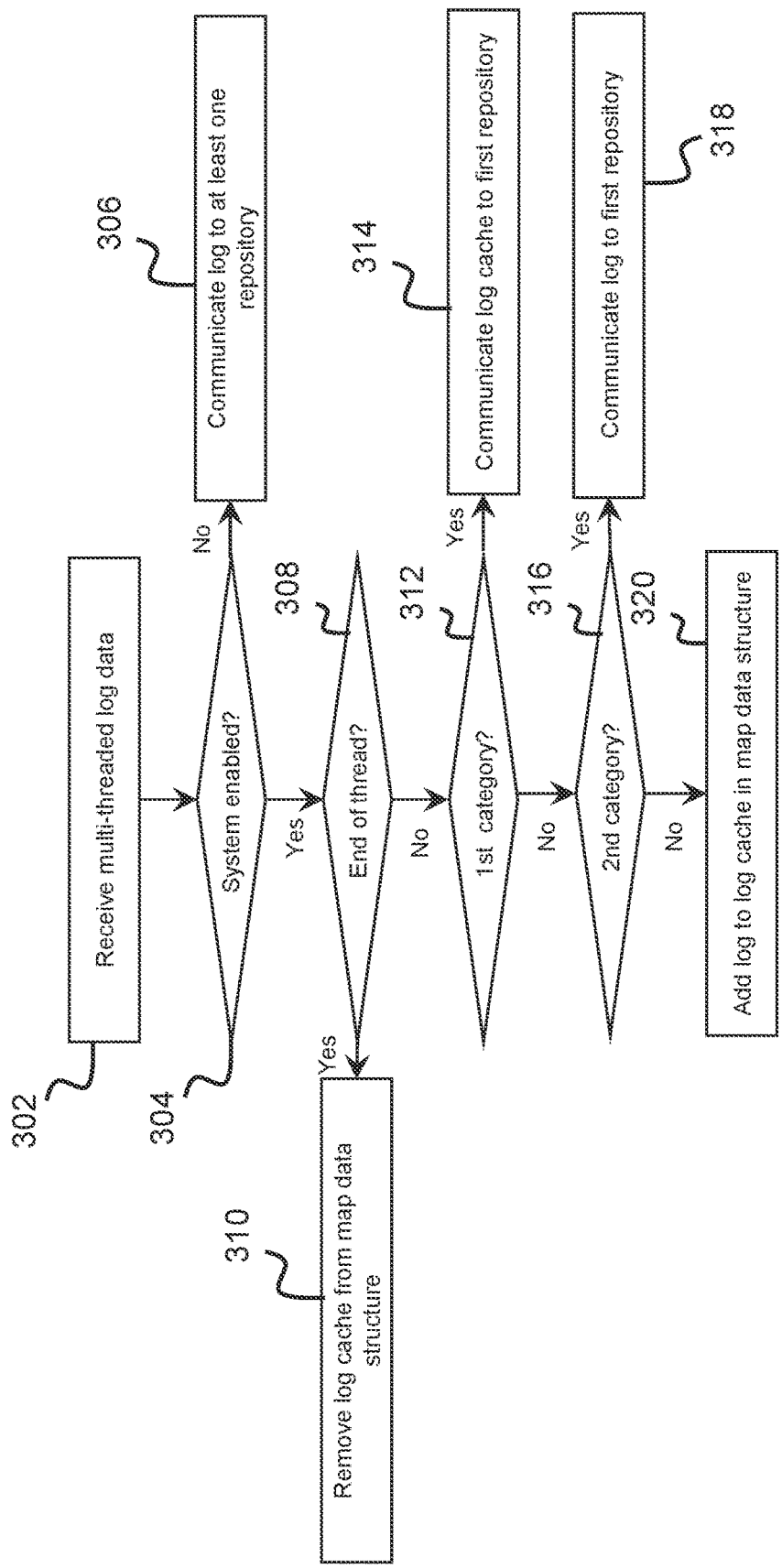
FIG. 3 is a flow diagram for an exemplary implementation of a method of efficiently storing multi-threaded log data according to some non-limiting embodiments or aspects.

For the purpose of illustration, further details regarding determining whether to communicate the log and/or log cache to first repository 112, according to some non-limiting embodiments or aspects, are shown in FIG. 3.

As shown in FIG. 2, at step 212, process 200 may include communicating the log to a second repository. For example, for each respective log of the multi-threaded log data, multi-threaded log system 104 may communicate the respective log to second repository 114.

In some non-limiting embodiments or aspects, every log may be communicated to second repository 114 (e.g., regardless of the marker and/or category associated with the log). As such, second repository 114 may serve as a backup (e.g., since only some logs will be communicated to first repository 112 and since some logs and/or log caches 110 may eventually be removed from the respective log caches 110 and/or map data structure 108, respectively, as described herein).

As shown in FIG. 2, at step 214, process 200 may include determining whether to remove an oldest log (e.g., from the log cache). For example, for each respective log of the multi-threaded log data, multi-threaded log system 104 may determine whether to remove an oldest log from the respective log cache 110 based on at least one of a log cache size limit or a time limit.

In some non-limiting embodiments or aspects, determining whether to remove the oldest log from the respective log cache 110 may include determining (e.g., by multi-threaded log system 104) that the oldest log from the respective log cache 110 is older than the time limit and/or determining (e.g., by multi-threaded log system 104) that a number of logs of the respective log cache 110 is greater than the log cache size limit. For example, multi-threaded log system 104 may determine to remove the oldest log only if both the oldest log is older than the time limit and the number of logs is greater than the log cache size limit. Alternatively, multi-threaded log system 104 may determine to remove the oldest log if either the oldest log is older than the time limit or the number of logs is greater than the log cache size limit.

As shown in FIG. 2, at step 216, process 200 may include determining whether to remove a least recently used log cache (e.g., from the map data structure). For example, for each respective log of the multi-threaded log data, multi-threaded log system 104 may determine whether to remove a least recently used log cache 110 from map data structure 108 based on at least one map data structure size limit. The least recently used log cache 110 may be associated with a least recently used item (e.g., thread identifier) in thread reference cache 106. For example, multi-threaded log system 104 may determine which log cache 110 is the least recently used log cache 110 based on the least recently used item (e.g., thread identifier, which may be associated with the respective key in map data structure 108 for the least recently used log cache 110) in thread reference cache 106.

In some non-limiting embodiments or aspects, the at least one map data structure size limit may include a lower map data structure size limit and a higher map data structure size limit. For example, determining whether to remove the least recently used log cache 110 from map data structure 108 may include determining (e.g., by multi-threaded log system 104) that a number of log caches 110 of map data structure 108 is greater than the higher map data structure size limit. Additionally, multi-threaded log system 104 may determine to remove the least recently used log cache 110 and each next least recently used log cache 110 until the number of log caches 110 of map data structure 108 is less than or equal to the lower map data structure size limit.

Figure 4A:
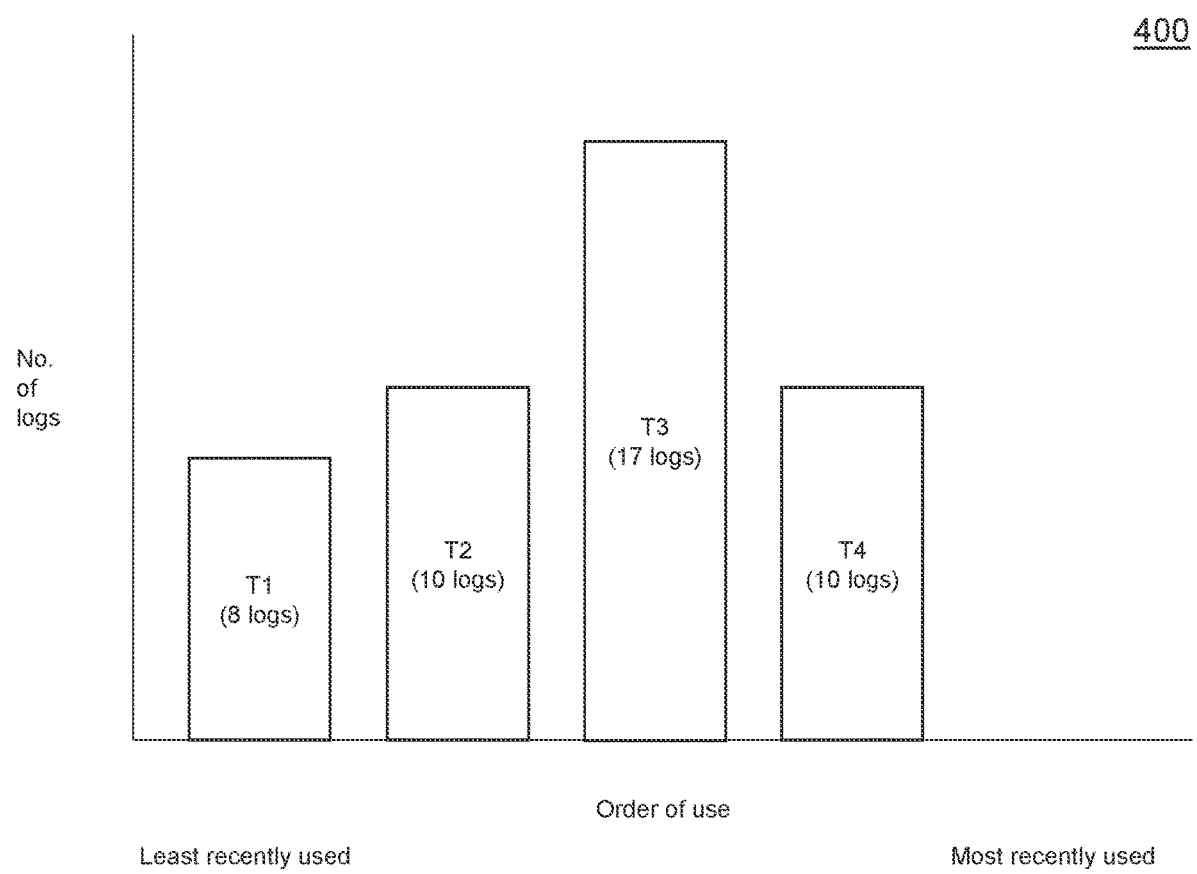
FIGS. 4A-4C are graphs for an exemplary implementation of a method of efficiently storing multi-threaded log data according to some non-limiting embodiments or aspects.
Figure 4B:
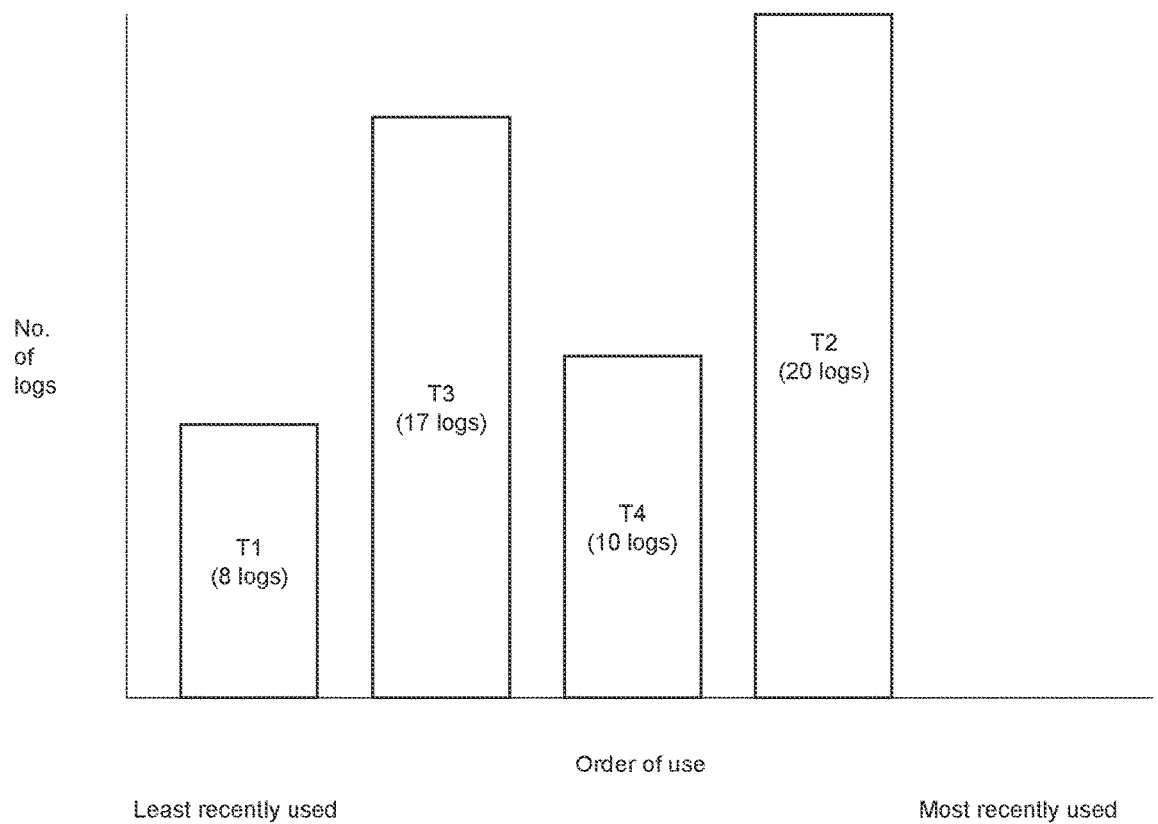
Figure 4C:
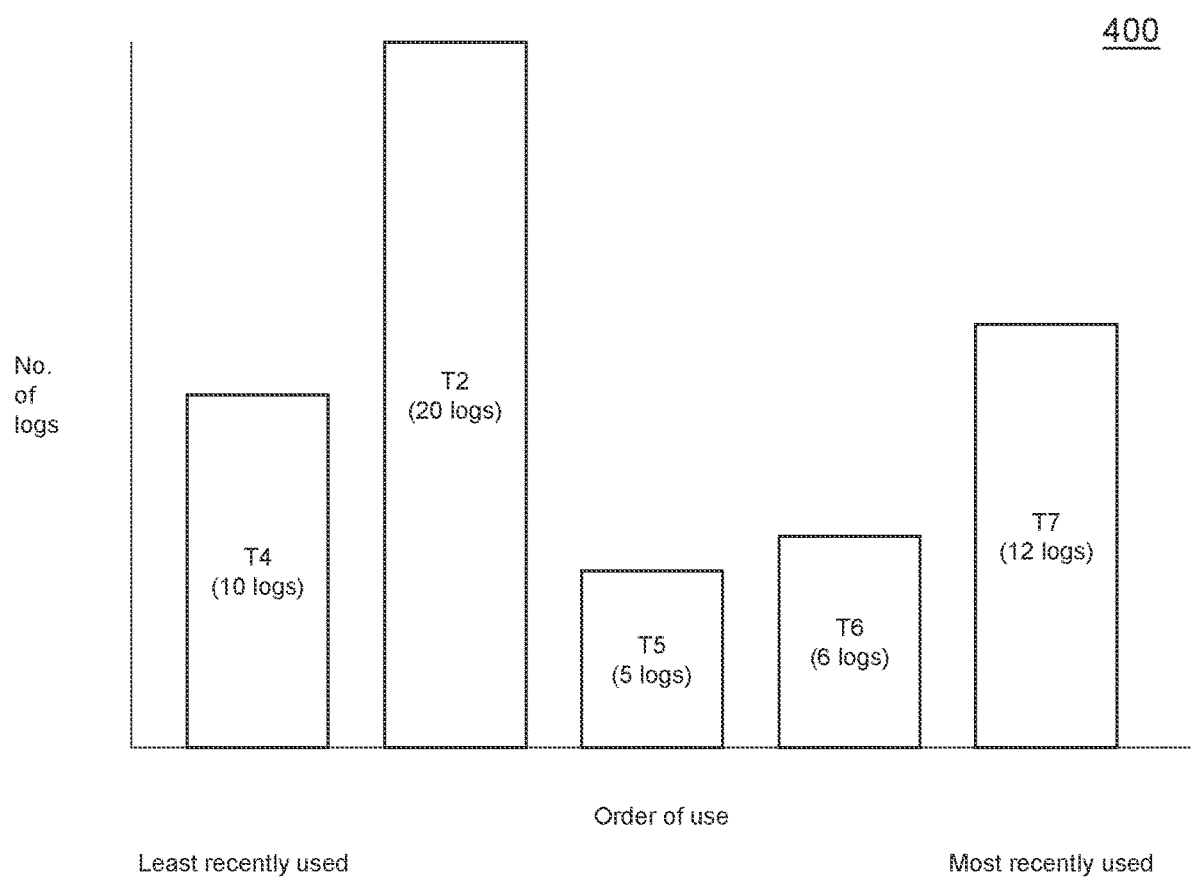

For the purpose of illustration, further details regarding determining whether to remove the oldest log and/or the least recently used log cache, according to some non-limiting embodiments or aspects, are shown in FIGS. 4A-4C.

Referring now to FIG. 3, shown is an implementation 300 of the process 200 for efficiently storing multi-threaded log data according to some non-limiting embodiments or aspects. The steps shown in FIG. 3 are for example purposes only. It will be appreciated that additional, fewer, different, and/or a different order of steps may be used in non-limiting embodiments or aspects.

As shown in FIG. 3, at step 302, implementation 300 may include receiving multi-threaded log data. For example, multi-threaded log system 104 may receive multi-threaded log data, as described herein.

As shown in FIG. 3, at step 304, implementation 300 may include determining whether multi-threaded log system 104 is enabled. If not, at step 306, multi-threaded log system 104 may simply communicate each log of multi-threaded log data to first repository 112 and/or second repository 114. If multi-threaded log system 104 is enabled, implementation 300 may proceed to step 308.

As shown in FIG. 3, at step 308, implementation 300 may include determining whether the respective log from the multi-threaded log data is the end of its respective thread. For example, the respective marker associated with the respective log may indicate that the respective log is the end of the respective thread. If so, multi-threaded log system 104 may determine that the respective log from the multi-threaded log data is the end of its respective thread, and, at step 310, multi-threaded log system 104 may remove the respective log cache 110 from map data structure 108. If the respective log is not the end of the respective thread, implementation 300 may proceed to step 312.

As shown in FIG. 3, at step 312, implementation 300 may include determining whether the respective log is associated with a first category. For example, the respective marker may indicate that the respective log is in the first category (or a subcategory of the first category). If so, multi-threaded log system 104 may determine that the respective log is in the first category, and, at step 314, multi-threaded log system 104 may communicate the respective log cache 110 (e.g., the respective log and any previously received logs from the respective thread stored in the respective log cache) to first repository 112. In some non-limiting embodiments or aspects, the respective data generator 102 that generates/communicates the respective log may determine whether the respective log is in the first category (or a subcategory thereof) based on any criterion and/or combination of criteria of the respective data generator 102, and the respective data generator 102 may set the respective marker of the respective log accordingly. Examples of markers indicating that a respective log is in the first category may include a critical error marker, a full log marker, a log up through now marker, and/or the like (each of which may be a subcategory of the first category). If the respective log is not in the first category, implementation 300 may proceed to step 316.

As shown in FIG. 3, at step 316, implementation 300 may include determining whether the respective log is associated with a second category. For example, the respective marker may indicate that the respective log is in the second category (or a subcategory of the second category). If so, multi-threaded log system 104 may determine that the respective log is in the second category, and, at step 318, multi-threaded log system 104 may communicate the respective log to first repository 112. In some non-limiting embodiments or aspects, the respective data generator 102 that generates/communicates the respective log may determine whether the respective log is in the second category (or a subcategory thereof) based on any criterion and/or combination of criteria of the respective data generator 102, and the respective data generator 102 may set the respective marker of the respective log accordingly. Examples of markers indicating that a respective log is in the second category may include a non-critical error marker, an always marker, a must have marker, a warning marker, a time sensitive marker, and/or the like (each of which may be a subcategory of the second category). If the respective log is not in the second category, implementation 300 may proceed to step 320.

As shown in FIG. 3, at step 320, implementation 300 may include adding (e.g., by multi-threaded log system 104) the respective log to the respective log cache 110 of map data structure 108, as described herein. For example, the respective marker may indicate that the respective log is in a third category (or a subcategory of the third category). If so, multi-threaded log system 104 may add the respective log to the respective log cache 110 of map data structure 108. In some non-limiting embodiments or aspects, the respective data generator 102 that generates/communicates the respective log may determine whether the respective log is in the third category (or a subcategory thereof) based on any criterion and/or combination of criteria of the respective data generator 102, and the respective data generator 102 may set the respective marker of the respective log accordingly. Examples of markers indicating that a respective log is in the third category may include an optional marker, an information only marker, and/or the like (each of which may be a subcategory of the third category).

Referring now to FIGS. 4A-4C, shown is an implementation 400 of the process 200 for efficiently storing multi-threaded log data according to some non-limiting embodiments or aspects. The graphs shown in FIGS. 4A-4C are for example purposes only. The graphs shown in FIGS. 4A-4C show the order of use on the horizontal axis and the number of logs in each log cache on the vertical axis.

As shown in FIG. 4A, map data structure 108 may initially include four log caches 110 associated with a first thread (T1), a second thread (T2), a third thread (T3), and a fourth thread (T4). For example, a first log cache 110 associated with the first thread (T1) may include 8 logs, a second log cache 110 associated with the second thread (T2) may include 10 logs, a third log cache 110 associated with the third thread (T3) may include 17 logs, and a fourth log cache 110 associated with the fourth thread (T4) may include 10 logs.

As shown in FIG. 4B, multi-threaded log data, including additional logs associated with the second thread (T2), may be received by multi-threaded log system 104. Multi-threaded log system 104 may set the thread identifier associated with the second thread (T2) as the most recently used item in thread reference cache 106, as described herein. Additionally, multi-threaded log system 104 may add the newly received logs to the respective log cache associated with the second thread (T2), as described herein. In some non-limiting embodiments or aspects, multi-threaded log system 104 may determine whether to remove the oldest log from the respective log cache 110 associated with the second thread (T2) based on determining that the oldest log from the respective log cache 110 is older than a time limit and that the number of logs of the respective log cache 110 is greater than the log cache size limit. For example, if the time limit is two minutes and the log cache size limit is 20 logs, and if the number of new logs received for the second thread (T2) was 11 new logs (in addition to the 10 previously stored logs, the oldest of which is five minutes old), multi-threaded log system 104 may remove the oldest log because the oldest log is older than the time limit and the number of logs is greater than the log cache size limit. As such, the respective log cache 110 for the second thread (T2) now includes 20 total logs.

As shown in FIG. 4C, multi-threaded log data, including new logs for a fifth thread (T5), a sixth thread (T6), and a seventh thread (T7), may be received by multi-threaded log system 104. Multi-threaded log system 104 may successively set the thread identifiers associated with the fifth thread (T5), the sixth thread (T6), and the seventh thread (T7) as the most recently used item in thread reference cache 106, as described herein, such that the seventh thread (T7) is now the most recently used item in thread reference cache 106. Additionally, multi-threaded log system 104 may generate new log caches 110 associated with the fifth thread (T5), the sixth thread (T6), and the seventh thread (T7), as described herein. In some non-limiting embodiments or aspects, the at least one map data structure size limit may include a lower map data structure size limit (e.g., five log caches) and a higher map data structure size limit (e.g., six log caches). For example, multi-threaded log system 104 may determine that a number of log caches 110 of map data structure 108 (e.g., a total of seven log caches) is greater than the higher map data structure size limit (e.g., six log caches). Additionally, multi-threaded log system 104 may determine to remove the least recently used log cache 110 (e.g., associated with first thread T1) and the next least recently used log cache 110 (e.g., associated with third thread T3) until the number of log caches 110 of map data structure 108 is less than or equal to the lower map data structure size limit (e.g., five log caches).

Referring now to FIGS. 5A-5C, shown is an implementation 500 of the process 200 for efficiently storing multi-threaded log data according to some non-limiting embodiments or aspects. The components shown in FIGS. 5A-5C are for example purposes only. In some non-limiting embodiments or aspects, multi-threaded log system 504, thread reference cache 506, first array 516-1, and second array 516-2 may be the same as or similar to multi-threaded log system 104, thread reference cache 106, first array 116-1, and second array 116-2, respectively.

As shown in FIG. 5A, multi-threaded log system 504 may include first array 516-1 and second array 516-2. For example, first array 516-1 initially may be named a buffer array, and second array 516-2 initially may be named a transfer array. Multi-threaded log system 504 may receive a first portion of the multi-threaded log data in the buffer array (e.g., first array 516-1) for a first buffer time period. For example, multi-threaded log data, including new logs for a third thread (T3), a second thread (T2), and a first thread (T1), may be received by multi-threaded log system 504 at the buffer array (e.g., first array 516-1).

As shown in FIG. 5B, after the first buffer time period, multi-threaded log system 504 may rename first array 516-1 the transfer array and rename second array 516-2 the buffer array. For example, multi-threaded log system 504 may initialize a temporary array and/or set the temporary array equal to the transfer array; multi-threaded log system 504 may then set the transfer array equal to the buffer array; and multi-threaded log system 504 may then set the buffer array equal to the temporary array.

As shown in FIG. 5C, multi-threaded log system 504 may receive a second portion of the multi-threaded log data at the buffer array (e.g., second array 516-2, which has now been renamed the buffer array) for a second buffer time period following the first buffer time period. For example, multi-threaded log data, including new logs for an eighth thread (T8), a seventh thread (T7), and an nth thread (Tn), may be received by multi-threaded log system 504 at the buffer array (e.g., second array 516-2). Meanwhile, multi-threaded log system 504 may successively set the respective thread identifier of each respective log from the first portion of the multi-threaded log data as a most recently used item in thread reference cache 506. For example, multi-threaded log system 504 may successively set the thread identifiers for the third thread (T3), the second thread (T2), and the first thread (T1) as the a most recently used item in thread reference cache 506 (e.g., the final order may be T1, T2, T3, T6, T5, T4, from most recently used to least recently used). Additionally, multi-threaded log system 504 may transfer the first portion of the multi-threaded log data from the transfer array (e.g., first array 516-1, which has now been renamed the transfer array) to the respective log caches (e.g., added to the respective log caches 110), as described herein.

After the second buffer time period, the arrays may once again be renamed (e.g., first array 516-1 may be renamed the buffer array, and second array 516-2 may be renamed the transfer array), and the process of receiving incoming multi-threaded log data by the buffer array while transferring previously received multi-threaded log data from the transfer array and then renaming the arrays may be repeated (e.g., continuously, until the multi-threaded log data is discontinued, and/or the like).

In some non-limiting embodiments or aspects, if first array 516-1 and second array 516-2 were not included, multi-threaded log system 504 may need to lock thread reference cache 506 (and/or the respective log cache 110) each time a log is received, while the thread identifier is set in thread reference cache 506 (and/or the log is added to the respective log cache 110), e.g., so that multiple thread identifiers are not set to thread reference cache 506 simultaneously from different threads, which may cause an error. Afterwards, thread reference cache 506 (and/or the respective log cache 110) may be unlocked. However, lock and unlock operations may be relatively time consuming and require computing resources. By utilizing first array 516-1 and second array 516-2 to temporarily store the incoming multi-threaded log data in one array for a short time period while transferring the previously received multi-threaded log data from the other array, the latency and usage of computing resources may be significantly reduced because lock and unlock operations may be reduced (e.g., eliminated, or at least limited to one lock and unlock cycle when the entire contents of the transfer array is being transferred).

Figure 6:
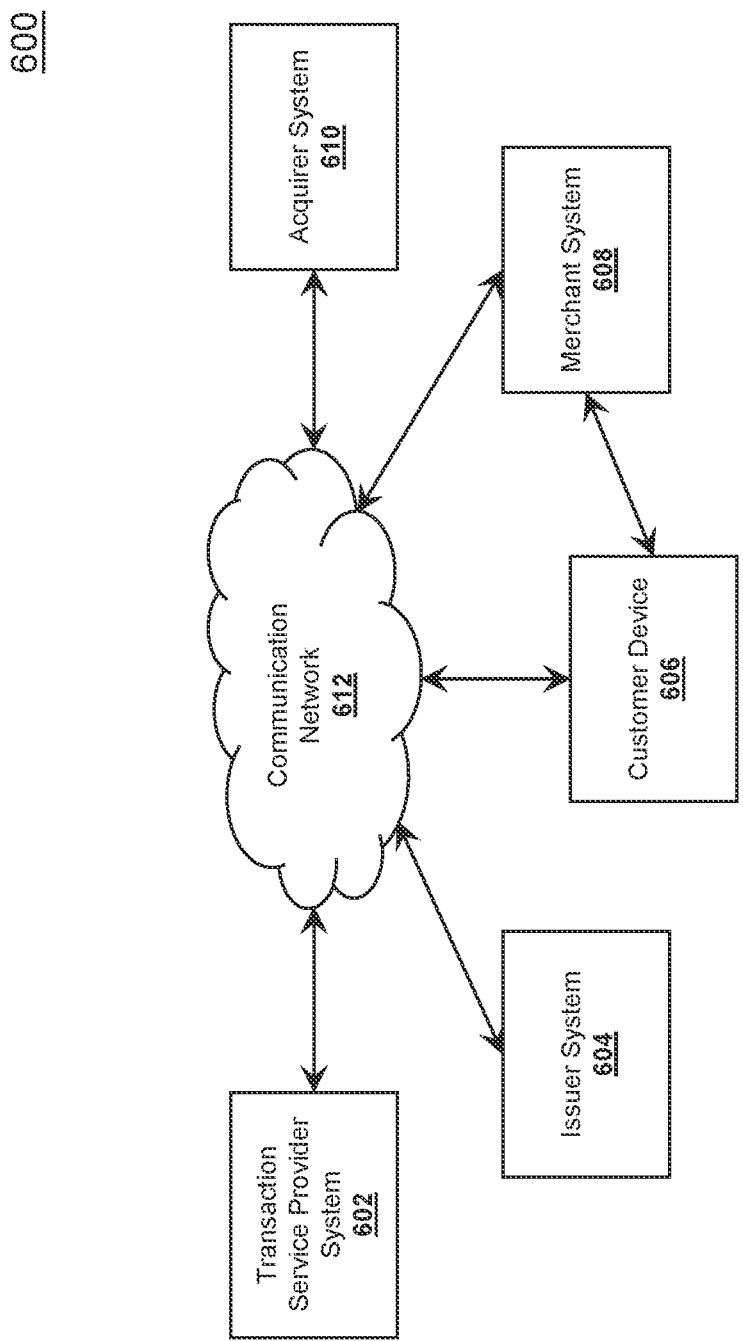
FIG. 6 is a diagram of a non-limiting embodiment or aspect of an environment in which methods, systems, and/or computer program products, described herein, may be implemented according to some non-limiting embodiments or aspects.

Referring now to FIG. 6, FIG. 6 is a diagram of a non-limiting embodiment or aspect of an environment 600 in which systems, products, and/or methods, as described herein, may be implemented. As shown in FIG. 6, environment 600 includes transaction service provider system 602, issuer system 604, customer device 606, merchant system 608, acquirer system 610, and communication network 612. In some non-limiting embodiments or aspects, each of data generators 102, multi-threaded log system 104, first repository 112, and/or second repository 114 may be implemented by (e.g., part of) transaction service provider system 602. In some non-limiting embodiments or aspects, at least one of data generators 102, multi-threaded log system 104, first repository 112, and/or second repository 114 may be implemented by (e.g., part of) another system, another device, another group of systems, or another group of devices, separate from or including transaction service provider system 602, such as issuer system 604, customer device 606, merchant system 608, acquirer system 610, and/or the like. For example, multi-threaded log system 104, first repository 112, second repository 114, and/or at least one data generator 102 may be implemented by (e.g., part of) transaction service provider system 602. Additionally or alternatively, at least one data generator 102 may be implemented by (e.g., part of) issuer system 604, customer device 606, merchant system 608, and/or acquirer system 610.

Transaction service provider system 602 may include one or more devices capable of receiving information from and/or communicating information to issuer system 604, customer device 606, merchant system 608, and/or acquirer system 610 via communication network 612. For example, transaction service provider system 602 may include a computing device, such as a server (e.g., a transaction processing server), a group of servers, and/or other like devices. In some non-limiting embodiments or aspects, transaction service provider system 602 may be associated with a transaction service provider, as described herein. In some non-limiting embodiments or aspects, transaction service provider system 602 may be in communication with a data storage device, which may be local or remote to transaction service provider system 602. In some non-limiting embodiments or aspects, transaction service provider system 602 may be capable of receiving information from, storing information in, communicating information to, or searching information stored in the data storage device.

Issuer system 604 may include one or more devices capable of receiving information and/or communicating information to transaction service provider system 602, customer device 606, merchant system 608, and/or acquirer system 610 via communication network 612. For example, issuer system 604 may include a computing device, such as a server, a group of servers, and/or other like devices. In some non-limiting embodiments or aspects, issuer system 604 may be associated with an issuer institution, as described herein. For example, issuer system 604 may be associated with an issuer institution that issued a credit account, debit account, credit card, debit card, and/or the like to a user associated with customer device 606.

Customer device 606 may include one or more devices capable of receiving information from and/or communicating information to transaction service provider system 602, issuer system 604, merchant system 608, and/or acquirer system 610 via communication network 612. Additionally or alternatively, each customer device 606 may include a device capable of receiving information from and/or communicating information to other customer devices 606 via communication network 612, another network (e.g., an ad hoc network, a local network, a private network, a virtual private network, and/or the like), and/or any other suitable communication technique. For example, customer device 606 may include a client device and/or the like. In some non-limiting embodiments or aspects, customer device 606 may or may not be capable of receiving information (e.g., from merchant system 608 or from another customer device 606) via a short-range wireless communication connection (e.g., an NFC communication connection, an RFID communication connection, a Bluetooth® communication connection, a Zigbee® communication connection, and/or the like), and/or communicating information (e.g., to merchant system 608) via a short-range wireless communication connection.

Merchant system 608 may include one or more devices capable of receiving information from and/or communicating information to transaction service provider system 602, issuer system 604, customer device 606, and/or acquirer system 610 via communication network 612. Merchant system 608 may also include a device capable of receiving information from customer device 606 via communication network 612, a communication connection (e.g., an NFC communication connection, an RFID communication connection, a Bluetooth® communication connection, a Zigbee® communication connection, and/or the like) with customer device 606, and/or the like, and/or communicating information to customer device 606 via communication network 612, the communication connection, and/or the like. In some non-limiting embodiments or aspects, merchant system 608 may include a computing device, such as a server, a group of servers, a client device, a group of client devices, and/or other like devices. In some non-limiting embodiments or aspects, merchant system 608 may be associated with a merchant, as described herein. In some non-limiting embodiments or aspects, merchant system 608 may include one or more client devices. For example, merchant system 608 may include a client device that allows a merchant to communicate information to transaction service provider system 602. In some non-limiting embodiments or aspects, merchant system 608 may include one or more devices, such as computers, computer systems, and/or peripheral devices capable of being used by a merchant to conduct a transaction with a user. For example, merchant system 608 may include a POS device and/or a POS system.

Acquirer system 610 may include one or more devices capable of receiving information from and/or communicating information to transaction service provider system 602, issuer system 604, customer device 606, and/or merchant system 608 via communication network 612. For example, acquirer system 610 may include a computing device, a server, a group of servers, and/or the like. In some non-limiting embodiments or aspects, acquirer system 610 may be associated with an acquirer, as described herein.

Communication network 612 may include one or more wired and/or wireless networks. For example, communication network 612 may include a cellular network (e.g., a long-term evolution (LTE) network, a third generation (4G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 606, a POS device of merchant system 608, and/or the like) may initiate the transaction, e.g., by generating an authorization request. Additionally or alternatively, the client device (e.g., customer device 606, at least one device of merchant system 608, and/or the like) may communicate the authorization request. For example, customer device 606 may communicate the authorization request to merchant system 608 and/or a payment gateway (e.g., a payment gateway of transaction service provider system 602, a third-party payment gateway separate from transaction service provider system 602, and/or the like). Additionally or alternatively, merchant system 608 (e.g., a POS device thereof) may communicate the authorization request to acquirer system 610 and/or a payment gateway. In some non-limiting embodiments or aspects, acquirer system 610 and/or a payment gateway may communicate the authorization request to transaction service provider system 602 and/or issuer system 604. Additionally or alternatively, transaction service provider system 602 may communicate the authorization request to issuer system 604. In some non-limiting embodiments or aspects, issuer system 604 may determine an authorization decision (e.g., authorize, decline, and/or the like) based on the authorization request. For example, the authorization request may cause issuer system 604 to determine the authorization decision based thereof. In some non-limiting embodiments or aspects, issuer system 604 may generate an authorization response based on the authorization decision. Additionally or alternatively, issuer system 604 may communicate the authorization response. For example, issuer system 604 may communicate the authorization response to transaction service provider system 602 and/or a payment gateway. Additionally or alternatively, transaction service provider system 602 and/or a payment gateway may communicate the authorization response to acquirer system 610, merchant system 608, and/or customer device 606. Additionally or alternatively, acquirer system 610 may communicate the authorization response to merchant system 608 and/or a payment gateway. Additionally or alternatively, a payment gateway may communicate the authorization response to merchant system 608 and/or customer device 606. Additionally or alternatively, merchant system 608 may communicate the authorization response to customer device 606. In some non-limiting embodiments or aspects, merchant system 608 may receive (e.g., from acquirer system 610 and/or a payment gateway) the authorization response. Additionally or alternatively, merchant system 608 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 606 and/or the like) and/or transaction data associated with the transaction. For example, merchant system 608 (e.g., a client device of merchant system 608, a POS device of merchant system 608, and/or the like) may initiate the transaction, e.g., by generating an authorization request (e.g., in response to receiving the account identifier from a portable financial device of the customer and/or the like). Additionally or alternatively, merchant system 608 may communicate the authorization request to acquirer system 610. Additionally or alternatively, acquirer system 610 may communicate the authorization request to transaction service provider system 602. Additionally or alternatively, transaction service provider system 602 may communicate the authorization request to issuer system 604. Issuer system 604 may determine an authorization decision (e.g., authorize, decline, and/or the like) based on the authorization request, and/or issuer system 604 may generate an authorization response based on the authorization decision and/or the authorization request. Additionally or alternatively, issuer system 604 may communicate the authorization response to transaction service provider system 602. Additionally or alternatively, transaction service provider system 602 may communicate the authorization response to acquirer system 610, which may communicate the authorization response to merchant system 608.

For the purpose of illustration, clearing and/or settlement of a transaction may include generating a message (e.g., clearing message, settlement message, and/or the like) based on an account identifier of a customer (e.g., associated with customer device 606 and/or the like) and/or transaction data associated with the transaction. For example, merchant system 608 may generate at least one clearing message (e.g., a plurality of clearing messages, a batch of clearing messages, and/or the like). Additionally or alternatively, merchant system 608 may communicate the clearing message(s) to acquirer system 610. Additionally or alternatively, acquirer system 610 may communicate the clearing message(s) to transaction service provider system 602. Additionally or alternatively, transaction service provider system 602 may communicate the clearing message(s) to issuer system 604. Additionally or alternatively, issuer system 604 may generate at least one settlement message based on the clearing message(s). Additionally or alternatively, issuer system 604 may communicate the settlement message(s) and/or funds to transaction service provider system 602 (and/or a settlement bank system associated with transaction service provider system 602). Additionally or alternatively, transaction service provider system 602 (and/or the settlement bank system) may communicate the settlement message(s) and/or funds to acquirer system 610, which may communicate the settlement message(s) and/or funds to merchant system 608 (and/or an account associated with merchant system 608).

In some non-limiting embodiments or aspects, each of the aforementioned messages (e.g., authorization request, authorization response, settlement message, clearing message, and/or the like) may be a log, as described herein.

The number and arrangement of systems, devices, and/or networks shown in FIG. 6 are provided as an example. There may be additional systems, devices, and/or networks; fewer systems, devices, and/or networks; different systems, devices, and/or networks; and/or differently arranged systems, devices, and/or networks than those shown in FIG. 6. Furthermore, two or more systems or devices shown in FIG. 6 may be implemented within a single system or device, or a single system or device shown in FIG. 6 may be implemented as multiple, distributed systems or devices. Additionally or alternatively, a set of systems (e.g., one or more systems) or a set of devices (e.g., one or more devices) of environment 600 may perform one or more functions described as being performed by another set of systems or another set of devices of environment 600.

Referring now to FIG. 7, shown is a diagram of example components of a device 700 according to non-limiting embodiments or aspects. Device 700 may correspond to data generator 102, multi-threaded log system 104, first repository 112, and/or second repository 114 in FIGS. 1A-1C and/or transaction service provider system 602, issuer system 604, customer device 606, merchant system 608, and/or acquirer system 610 in FIG. 6, as an example. In some non-limiting embodiments or aspects, such systems or devices may include at least one device 700 and/or at least one component of device 700. The number and arrangement of components shown are provided as an example. In some non-limiting embodiments or aspects, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

As shown in FIG. 7, device 700 may include bus 702, processor 704, memory 706, storage component 708, input component 710, output component 712, and communication interface 714. Bus 702 may include a component that permits communication among the components of device 700. In some non-limiting embodiments or aspects, processor 704 may be implemented in hardware, software, or a combination of hardware and software. For example, processor 704 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 706 may include random access memory (RAM), read only memory (ROM), and/or another type of dynamic or static storage device (e.g., flash memory, magnetic memory, optical memory, etc.) that stores information and/or instructions for use by processor 704.

With continued reference to FIG. 7, storage component 708 may store information and/or software related to the operation and use of device 700. For example, storage component 708 may include a hard disk (e.g., a magnetic disk, an optical disk, a magneto-optic disk, a solid state disk, etc.) and/or another type of computer-readable medium.

Input component 710 may include a component that permits device 700 to receive information, such as via user input (e.g., a touch screen display, a keyboard, a keypad, a mouse, a button, a switch, a microphone, etc.). Additionally, or alternatively, input component 710 may include a sensor for sensing information (e.g., a global positioning system (GPS) component, an accelerometer, a gyroscope, an actuator, etc.). Output component 712 may include a component that provides output information from device 700 (e.g., a display, a speaker, one or more light-emitting diodes (LEDs), etc.). Communication interface 714 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 714 may permit device 700 to receive information from another device and/or provide information to another device. For example, communication interface 714 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 700 may perform one or more processes described herein. Device 700 may perform these processes based on processor 704 executing software instructions stored by a computer-readable medium, such as memory 706 and/or storage component 708. A computer-readable medium may include any non-transitory memory device. A non-transitory memory device includes memory space located inside of a single physical storage device or memory space spread across multiple physical storage devices. Software instructions may be read into memory 706 and/or storage component 708 from another computer-readable medium or from another device via communication interface 714. When executed, software instructions stored in memory 706 and/or storage component 708 may cause processor 704 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
receiving, with at least one processor, multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories comprising a first category, a second category, and a third category, each respective thread identifier indicating that the respective log is associated with a respective thread of a plurality of threads;

for each respective log of the plurality of logs:
setting, with at least one processor, the respective thread identifier of the respective log as a most recently used item in a thread reference cache;
determining, with at least one processor, a respective log cache of a plurality of log caches in a map data structure based on the respective thread identifier for the respective log, wherein a respective key for the map data structure is based on the respective thread identifier, and wherein the respective log cache is a respective value associated with the respective key;
adding, with at least one processor, the respective log to the respective log cache in the map data structure;
determining, with at least one processor, whether to communicate at least one of the respective log or the respective log cache to a first repository based on the respective marker for the respective log, wherein determining whether to communicate the at least one of the respective log or the respective log cache comprises:
determining to communicate the respective log cache to the first repository when the respective marker indicates that the respective log is in the first category;
determining to communicate the respective log to the first repository when the respective marker indicates that the respective log is in the second category; or
determining not to communicate the respective log or the respective log cache to the first repository when the respective log is in the third category;
communicating, with at least one processor, the respective log to a second repository, wherein the first repository comprises a higher-speed repository and the second repository comprises a lower-speed repository;
determining, with at least one processor, whether to remove an oldest log from the respective log cache based on at least one of a log cache size limit or a time limit; and
determining, with at least one processor, whether to remove a least recently used log cache from the map data structure based on at least one map data structure size limit, wherein the least recently used log cache is associated with a least recently used item in the thread reference cache.

2. The computer-implemented method of claim 1, wherein the first repository comprises a cloud repository, and
wherein the second repository comprises an internal repository separate from the cloud repository.

3. The computer-implemented method of claim 1, wherein the first repository comprises a cache, and
wherein the second repository comprises a persistent storage database.

4. The computer-implemented method of claim 1, wherein the second repository comprises a remote cache.

5. The computer-implemented method of claim 1, wherein receiving the multi-threaded log data comprises receiving the multi-threaded log data from a plurality of data generators, each respective thread identifier associated with the respective thread from a respective data generator of the plurality of data generators.

6. The computer-implemented method of claim 5, wherein, for each respective log of the plurality of logs, the respective data generator of the plurality of data generators sets the respective marker based on the respective category of the respective log.

7. The computer-implemented method of claim 1, wherein determining whether to remove the oldest log from the respective log cache based on the at least one of the log cache size limit or the time limit comprises:
determining that the oldest log from the respective log cache is older than the time limit;
determining that a number of logs of the respective log cache is greater than the log cache size limit; and
determining to remove the oldest log based on the oldest log being older than the time limit and the number of logs being greater than the log cache size limit.

8. The computer-implemented method of claim 1, wherein the at least one map data structure size limit comprises a lower map data structure size limit and a higher map data structure size limit, and wherein determining whether to remove the least recently used log cache from the map data structure based on the at least one map data structure size limit comprises:
determining that a number of log caches of the map data structure is greater than the higher map data structure size limit; and
determining to remove the least recently used log cache and each next least recently used log cache until the number of log caches of the map data structure is less than or equal to the lower map data structure size limit.

9. The computer-implemented method of claim 1, wherein a first array is initially named a buffer array and wherein a second array is initially named a transfer array, and wherein receiving the multi-threaded log data comprises:
receiving a first portion of the multi-threaded log data in the first array named the buffer array for a first buffer time period;
after the first buffer time period, renaming the first array the transfer array and renaming the second array the buffer array; and
receiving a second portion of the multi-threaded log data in the second array renamed the buffer array for a second buffer time period following the first buffer time period.

10. A system, comprising:
a first repository comprising at least one first processor;
a second repository comprising at least one second processor; and
a multi-threaded log system comprising a thread reference cache, a map data structure comprising a plurality of log caches, and at least one third processor, the at least one third processor configured to:
receive multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories comprising a first category, a second category, and a third category, each respective thread identifier indicating that the respective log is associated with a respective thread of a plurality of threads;

for each respective log of the plurality of logs:
set the respective thread identifier of the respective log as a most recently used item in the thread reference cache;
determine a respective log cache of the plurality of log caches in the map data structure based on the respective thread identifier for the respective log, wherein a respective key for the map data structure is based on the respective thread identifier, and wherein the respective log cache is a respective value associated with the respective key;
add the respective log to the respective log cache in the map data structure;
determine whether to communicate at least one of the respective log or the respective log cache to the first repository based on the respective marker for the respective log, wherein when determining whether to communicate the at least one of the respective log or the respective log cache, the at least one third processor is configured to:
determine to communicate the respective log cache to the first repository when the respective marker indicates that the respective log is in the first category;
determine to communicate the respective log to the first repository when the respective marker indicates that the respective log is in the second category; or
determine not to communicate the respective log or the respective log cache to the first repository when the respective log is in the third category;
communicate the respective log to the second repository, wherein the first repository comprises a higher-speed repository and the second repository comprises a lower-speed repository;
determine whether to remove an oldest log from the respective log cache based on at least one of a log cache size limit or a time limit; and
determine whether to remove a least recently used log cache from the map data structure based on at least one map data structure size limit, wherein the least recently used log cache is associated with a least recently used item in the thread reference cache.

11. The system of claim 10, wherein the first repository comprises a cloud repository, and
wherein the second repository comprises an internal repository separate from the cloud repository.

12. The system of claim 10, wherein the second repository comprises a remote cache.

13. The system of claim 10, further comprising a plurality of data generators;
wherein, when receiving the multi-threaded log data, the at least one third processor is configured to receive the multi-threaded log data from the plurality of data generators, each respective thread identifier associated with the respective thread from a respective data generator of the plurality of data generators; and
wherein, for each respective log of the plurality of logs, the respective data generator of the plurality of data generators is configured to set the respective marker based on the respective category of the respective log.

14. The system of claim 10, wherein, when determining whether to remove the oldest log from the respective log cache based on the at least one of the log cache size limit or the time limit, the at least one third processor is configured to:
determine that the oldest log from the respective log cache is older than the time limit;
determine that a number of logs of the respective log cache is greater than the log cache size limit; and
determine to remove the oldest log based on the oldest log being older than the time limit and the number of logs being greater than the log cache size limit,
wherein the at least one map data structure size limit comprises a lower map data structure size limit and a higher map data structure size limit, and wherein, when determining whether to remove the least recently used log cache from the map data structure based on the at least one map data structure size limit, the at least one third processor is configured to:
determine that a number of log caches of the map data structure is greater than the higher map data structure size limit; and
determine to remove the least recently used log cache and each next least recently used log cache until the number of log caches of the map data structure is less than or equal to the lower map data structure size limit.

15. The system of claim 10, further comprising:
a first array initially named a buffer array; and
a second array initially named a transfer array,
wherein, when receiving the multi-threaded log data, the at least one third processor is configured to:
receive a first portion of the multi-threaded log data in the first array named the buffer array for a first buffer time period;
after the first buffer time period, rename the first array the transfer array and rename the second array the buffer array; and
receive a second portion of the multi-threaded log data in the second array renamed the buffer array for a second buffer time period following the first buffer time period.

16. A computer program product comprising at least one non-transitory computer-readable medium including one or more instructions that, when executed by at least one processor, cause the at least one processor to:
receive multi-threaded log data comprising a plurality of logs, a plurality of markers, and a plurality of thread identifiers, each respective log of the plurality of logs associated with a respective marker of the plurality of markers and a respective thread identifier of the plurality of thread identifiers, each respective marker indicating that the respective log is in a respective category of a plurality of categories comprising a first category, a second category, and a third category, each respective thread identifier indicating that the respective log is associated with a respective thread of a plurality of threads;
for each respective log of the plurality of logs:
set the respective thread identifier of the respective log as a most recently used item in a thread reference cache;
determine a respective log cache of a plurality of log caches in a map data structure based on the respective thread identifier for the respective log, wherein a respective key for the map data structure is based on the respective thread identifier, and wherein the respective log cache is a respective value associated with the respective key;
add the respective log to the respective log cache in the map data structure;

determine whether to communicate at least one of the respective log or the respective log cache to a first repository based on the respective marker for the respective log, wherein when determining whether to communicate the at least one of the respective log or the respective log cache, the at least one third processor is configured to:
- determine to communicate the respective log cache to the first repository when the respective marker indicates that the respective log is in the first category;
- determine to communicate the respective log to the first repository when the respective marker indicates that the respective log is in the second category; or
- determine not to communicate the respective log or the respective log cache to the first repository when the respective log is in the third category;

communicate the respective log to a second repository, wherein the first repository comprises a higher-speed repository and the second repository comprises a lower-speed repository;

determine whether to remove an oldest log from the respective log cache based on at least one of a log cache size limit or a time limit; and determine whether to remove a least recently used log cache from the map data structure based on at least one map data structure size limit, wherein the least recently used log cache is associated with a least recently used item in the thread reference cache.

* * * * *